(12) United States Patent
Sugiyama et al.

(10) Patent No.: US 10,401,504 B2
(45) Date of Patent: Sep. 3, 2019

(54) WEARABLE DEVICE AND METHOD OF CONTROLLING WEARABLE DEVICE

(71) Applicant: SEIKO EPSON CORPORATION, Tokyo (JP)

(72) Inventors: Tatsuhiko Sugiyama, Matsumoto (JP); Tsubasa Shirai, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/000,502

(22) Filed: Jun. 5, 2018

(65) Prior Publication Data
US 2018/0356534 A1    Dec. 13, 2018

(30) Foreign Application Priority Data
Jun. 7, 2017  (JP) ................................ 2017-112336

(51) Int. Cl.
| | |
|---|---|
| *G01S 19/49* | (2010.01) |
| *G01C 21/16* | (2006.01) |
| *G06F 3/01* | (2006.01) |
| *G01S 19/19* | (2010.01) |
| *G01S 19/34* | (2010.01) |
| *G06F 1/32* | (2019.01) |
| *G06F 3/038* | (2013.01) |
| *G06F 3/0346* | (2013.01) |

(52) U.S. Cl.
CPC ............ *G01S 19/49* (2013.01); *G01C 21/165* (2013.01); *G01S 19/19* (2013.01); *G01S 19/34* (2013.01); *G06F 1/32* (2013.01); *G06F 3/011* (2013.01); *G06F 3/038* (2013.01); *G06F 3/0346* (2013.01)

(58) Field of Classification Search
CPC ....... H04W 4/80; H04W 4/027; H04W 88/02; H04W 12/06; G01S 19/48; G01S 19/49
See application file for complete search history.

(56) References Cited

U.S. PATENT DOCUMENTS

2017/0307393 A1* 10/2017 Kobayashi ............ G01C 21/10

FOREIGN PATENT DOCUMENTS

JP    2004-163168 A    6/2004

* cited by examiner

*Primary Examiner* — Diane D Mizrahi
(74) *Attorney, Agent, or Firm* — Oliff PLC

(57) ABSTRACT

A running watch which is a wearable device includes a position detection unit (a GPS module), a sensor unit including at least one of an acceleration sensor, a geomagnetic sensor, and an atmospheric pressure sensor, and a processing unit electrically connected to the position detection unit and the sensor unit. The processing unit determines a behavior state of a user based on signals from the position detection unit and the sensor unit and controls at least two of the position detection unit, the acceleration sensor, the geomagnetic sensor, and the atmospheric pressure sensor based on the behavior state.

21 Claims, 17 Drawing Sheets

WEARABLE DEVICE AND METHOD OF CONTROLLING WEARABLE DEVICE

BACKGROUND

1. Technical Field

The present invention relates to a wearable device and a method of controlling the wearable device.

2. Related Art

In the related art, positional information acquisition systems using Global Positioning System (GPS) signals are known. In the systems using the GPS, for example, there is a disadvantage that GPS signals may not be received with high precision in valleys of buildings, indoors, and the like. Thus, to compensate for the disadvantage, technologies in which inertial navigation is used utilizing various sensors have been disclosed. In particular, many technologies have been disclosed for systems related to devices such as car navigation fixed to moving objects that move horizontally. However, for wearable devices of systems related to devices which are not only for horizontal movement, it is necessary to take more advanced technological measures in application of inertial navigation. As an application example of the inertial navigation in wearable devices of the systems in which devices are not only for horizontal movement, an inertial navigation system in which an acceleration sensor, a gyro sensor, and a geomagnetic sensor are utilized is disclosed in JP-A-2004-163168.

In the inertial navigation system in a wearable device of JP-A-2004-163168, an algorithm of the inertial navigation in which the number of steps and a step size of a user by an acceleration sensor and a walking azimuth of the user by a triaxial gyro sensor (angular velocity sensor) are used is utilized. However, since a gyro sensor in which substantially the same power as GPS is necessary in estimation of the walking azimuth is used, a battery lifetime may be shortened, and thus there is a problem that it is difficult to use a wearable device for a long time.

SUMMARY

An advantage of some aspects of the invention is to solve at least a part of the problems described above, and the invention can be implemented as the following forms or application examples.

Application Example 1

A wearable device according to this application example includes: a position detection unit; a sensor unit that includes at least one of an acceleration sensor, a geomagnetic sensor, and an atmospheric pressure sensor; and a processing unit that is electrically connected to the position detection unit and the sensor unit. The processing unit determines a behavior state of a user based on signals from the position detection unit and the sensor unit. At least two of the position detection unit, the acceleration sensor, the geomagnetic sensor, and the atmospheric pressure sensor are controlled based on the behavior state.

According to the wearable device according to this application example, the positional information of the user can be obtained by controlling at least two of the position detection unit, the acceleration sensor, the geomagnetic sensor, and the atmospheric pressure sensor based on the behavior state of the user determined based on the signals from the position detection unit and the sensor unit. In this way, by utilizing the acceleration sensor, the geomagnetic sensor, and the atmospheric pressure sensor of which power consumption is relatively small and controlling the position detection unit to be operated and the various sensors in accordance with the behavior state of the user, it is possible to reduce power consumption necessary for the operations and it is possible to lengthen a battery lifetime. Accordingly, the wearable device can be used for a long time.

Application Example 2

In the wearable device according to the application example, it is preferable that the behavior state includes a linear movement and a curve movement, and the processing unit activates the position detection unit when a predetermined direction change is detected based on the signals from the position detection unit and the sensor unit.

According to this application example, when the user is moving in the same direction, the position detection unit of which power consumption is large is stopped (deactivated) and positional information is estimated by another sensor. When the predetermined direction change of the user is detected, that is, it is determined that the user has moved in a different direction from the previous direction, the position detection unit is activated to acquire detailed positional information. In this way, since an operation time of the position detection unit of which power consumption is large can be shortened and the positional information can be acquired, it is possible to reduce power consumption. The "predetermined direction change" refers to a case in which the magnitude of a set direction change is set as a reference value and a direction change greater than the reference value occurs.

Application Example 3

In the wearable device according to the application example, it is preferable that the behavior state includes a behavior with a body movement period, the processing unit determines a kind of behavior of the user based on the body movement period, and at least two of the position detection unit, the acceleration sensor, the geomagnetic sensor, and the atmospheric pressure sensor are controlled in accordance with the kind of behavior.

According to this application example, the positional information of the user can be obtained by determining the kind of behavior of the user based on the body movement period included in the behavior state and controlling at least two of the position detection unit, the acceleration sensor, the geomagnetic sensor, and the atmospheric pressure sensor in accordance with the kind of behavior. In this way, by utilizing the acceleration sensor, the geomagnetic sensor, and the atmospheric pressure sensor of which power consumption is relatively small and controlling the position detection unit to be operated and the various sensors in accordance with the behavior state of the user, it is possible to reduce power consumption necessary for the operations and it is possible to lengthen a battery lifetime. Accordingly, the wearable device can be used for a long time.

Application Example 4

In the wearable device according to the application example, it is preferable that the processing unit controls at least two of the position detection unit, the acceleration sensor, the geomagnetic sensor, and the atmospheric pressure sensor in accordance with the body movement period of the user.

According to this application example, the positional information of the user can be obtained by controlling at least two of the position detection unit, the acceleration sensor, the geomagnetic sensor, and the atmospheric pressure sensor in accordance with the body movement period of the user. In this way, by utilizing the acceleration sensor, the geomagnetic sensor, and the atmospheric pressure sensor of which power consumption is relatively small and controlling the position detection unit to be operated and the various sensors in accordance with the behavior state of the user, it is possible to reduce power consumption necessary for the operations and it is possible to lengthen a battery lifetime. Accordingly, the wearable device can be used for a long time.

Application Example 5

In the wearable device according to the application example, it is preferable that the processing unit activates the position detection unit in accordance with the kind of behavior or the body movement period.

According to this application example, the position detection unit is activated to acquire detailed positional information in accordance with the kind of behavior or the body movement period of the user. In this way, since an operation time of the position detection unit of which power consumption is large can be shortened and the positional information can be acquired, it is possible to reduce power consumption.

Application Example 6

In the wearable device according to the application example, when the processing unit activates the position detection unit, the processing unit preferably selects one of stopping of the acceleration sensor and activation of a learning function.

According to this application example, whether the learning of the positional information of the position detection unit and detected data of the acceleration sensor is necessary is determined and whether to stop the acceleration sensor is selected. Thus, since an unnecessary operation of the acceleration sensor can be excluded, it is possible to further reduce the power consumption.

Application Example 7

In the wearable device according to the application example, it is preferable that, when the processing unit activates the position detection unit, the processing unit selects one of stopping of the geomagnetic sensor or activation of a learning function.

According to this application example, whether the learning of the positional information of the position detection unit and detected data of the geomagnetic sensor is necessary is determined and whether to stop the geomagnetic sensor is selected. Thus, since an unnecessary operation of the geomagnetic sensor can be excluded, it is possible to further reduce power consumption.

Application Example 8

In the wearable device according to the application example, it is preferable that the processing unit stops the position detection unit when the processing unit determines that the user is performing a linear movement by a predetermined distance or for a predetermined time based on a signal from the geomagnetic sensor.

According to this application example, when the user is performing the linear movement for the predetermined time, the positional information estimated by the acceleration sensor or the atmospheric pressure sensor can be obtained without using the position detection unit. Accordingly, since power for operating the position detection unit is not necessary, it is possible to reduce power consumption.

Application Example 9

In the wearable device according to the application example, it is preferable that the position detection unit includes an RF reception circuit unit, a baseband circuit unit, and an arithmetic unit, and when the position detection unit is stopped, at least one of the RF reception circuit unit, the baseband circuit unit, and the arithmetic unit is stopped.

According to this application example, by stopping at least one of the RF reception circuit unit, the baseband circuit unit, and the arithmetic unit among constituent elements of the position detection unit, it is possible to reduce power consumption.

Application Example 10

In the wearable device according to the application example, it is preferable that an operation time of the sensor unit is longer than an operation time of the position detection unit.

According to this application example, by shortening the operation time of the position detection unit of which power consumption is relatively large than an operation time of a sensor included in the sensor unit, it is possible to achieve low power consumption.

Application Example 11

In the wearable device according to the application example, it is preferable that a stop timing of the position detection unit is a subsequent time to an activation timing of the sensor unit.

According to this application example, it is possible to frequently obtain a time in which an operation of the position detection unit and an operation of a sensor included in the sensor unit can overlap, and thus it is possible to frequently perform learning.

Application Example 12

In the wearable device according to the application example, it is preferable that an activation timing of the position detection unit is a previous time to the stop timing of the sensor unit.

According to this application example, it is possible to frequently obtain a time in which an operation of the position detection unit and an operation of a sensor included in the sensor unit can overlap, and thus it is possible to frequently perform learning.

Application Example 13

In the wearable device according to the application example, it is preferable that, when the position detection unit is operating and the sensor unit is operating, correlation between a positioning result of the position detection unit and an output of the sensor unit is learned.

According to this application example, by learning correlation between a positioning result of the position detection unit during the operation of the position detection unit and the operation of the sensor unit and the output of the sensor unit, it is possible to improve estimation precision of the positional information by the sensor unit.

Application Example 14

A method of controlling a wearable device according to this application example includes: determining a behavior state of a user based on a signal from a sensor unit including at least one of a position detection unit, an acceleration sensor, a geomagnetic sensor, and an atmospheric pressure sensor; and controlling at least two of the position detection unit, the acceleration sensor, the geomagnetic sensor, and the atmospheric pressure sensor based on the behavior state.

According to the method of controlling the wearable device according to this application example, the positional information of the user can be obtained by controlling at least two of the position detection unit, the acceleration sensor, the geomagnetic sensor, and the atmospheric pressure sensor based on the behavior state of the user determined based on the signals from the position detection unit and the sensor unit. In this way, by utilizing the acceleration sensor, the geomagnetic sensor, and the atmospheric pressure sensor of which power consumption is relatively low and controlling the position detection unit to be operated and the various sensors in accordance with the behavior state of the user, it is possible to reduce power consumption necessary for the operations and it is possible to lengthen a battery lifetime. Accordingly, the wearable device can be used for a long time.

Application Example 15

In the method of controlling the wearable device according to the application example, it is preferable that the method further includes: determining a kind of behavior of the user based on a body movement period included in the behavior state; and controlling at least two of the position detection unit, the acceleration sensor, the geomagnetic sensor, and the atmospheric pressure sensor in accordance with the kind of behavior.

According to this application example, the positional information of the user can be obtained by controlling at least two of the position detection unit, the acceleration sensor, the geomagnetic sensor, and the atmospheric pressure sensor based on the body movement period included in the behavior state of the user determined based on the signals from the position detection unit and the sensor unit. In this way, by utilizing the acceleration sensor, the geomagnetic sensor, and the atmospheric pressure sensor of which power consumption is relatively low and controlling the position detection unit to be operated and the various sensors in accordance with the behavior state of the user, it is possible to reduce power consumption necessary for the operations and it is possible to lengthen a battery lifetime. Accordingly, the wearable device can be used for a long time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of an exercise support system including a wearable device (a portable electronic device) according to the invention and a method of controlling the wearable device will be described. Embodiments to be described below should not be construed to limit content of the invention described in the appended claims. All the constituents to be described in each embodiment may not be said to be requisite constituents of the invention.

1. Exercise Support System Including Wearable Device

First, an embodiment of the exercise support system including the wearable device (a portable electronic device) according to the invention will be described. Hereinafter, a wearable device that is worn on a wrist of a user and includes a sensor unit including a position detection unit, an acceleration sensor, a geomagnetic sensor, and an atmospheric pressure sensor will be exemplified as a detection device used in the exercise support system in the description. As the position detection unit, for example, wireless positioning in which an absolute position can be calculated in cooperation with Global Positioning System (GPS), radio communication waves, or a network can be applied.

As the wearable device in the present specification, for example, a wearable device worn on a wrist will be described, but the wearable device according to each embodiment may be worn on another part of the user such as a neck or an ankle. The wearable device according to each embodiment may include a sensor other than an acceleration sensor, a geomagnetic sensor, and an atmospheric pressure sensor.

1.1. Configuration of Exercise Support System

Figure 1:
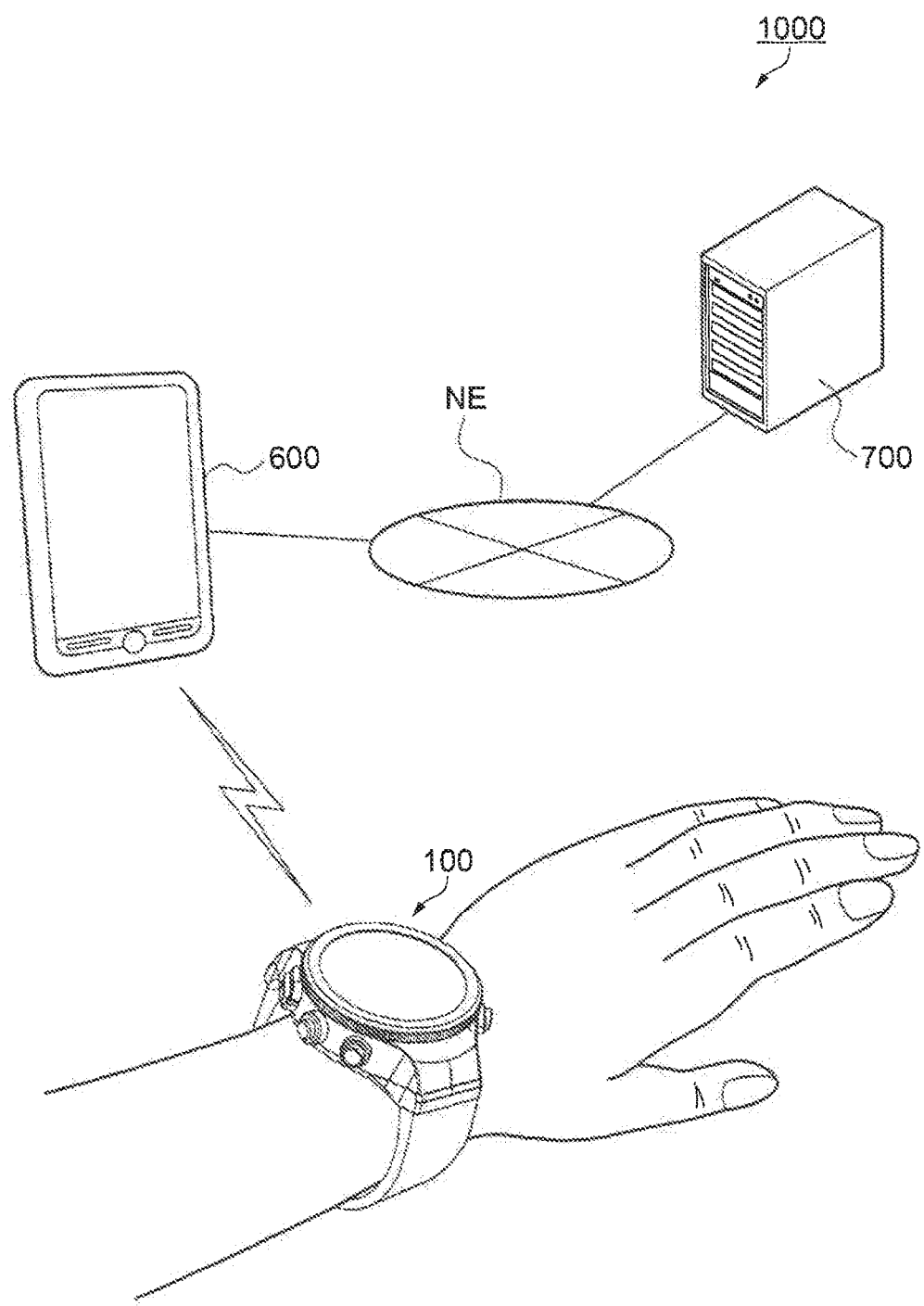
FIG. 1 is a schematic configuration diagram illustrating an overview of an exercise support system including a wearable device according to the invention.
Figure 2:
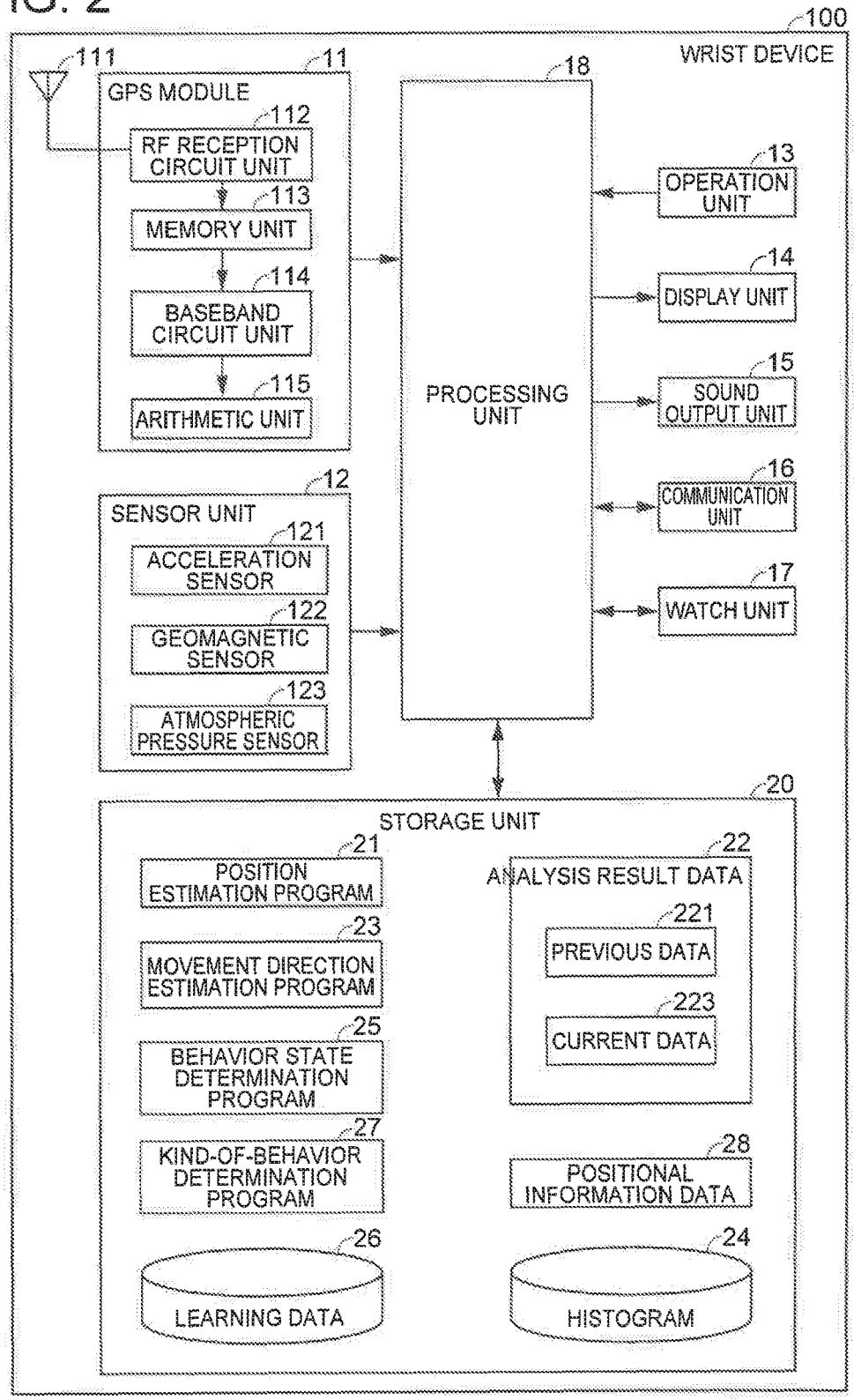
FIG. 2 is a block diagram illustrating a main configuration example of a running watch in an embodiment of the wearable device according to the invention.
Figure 3:
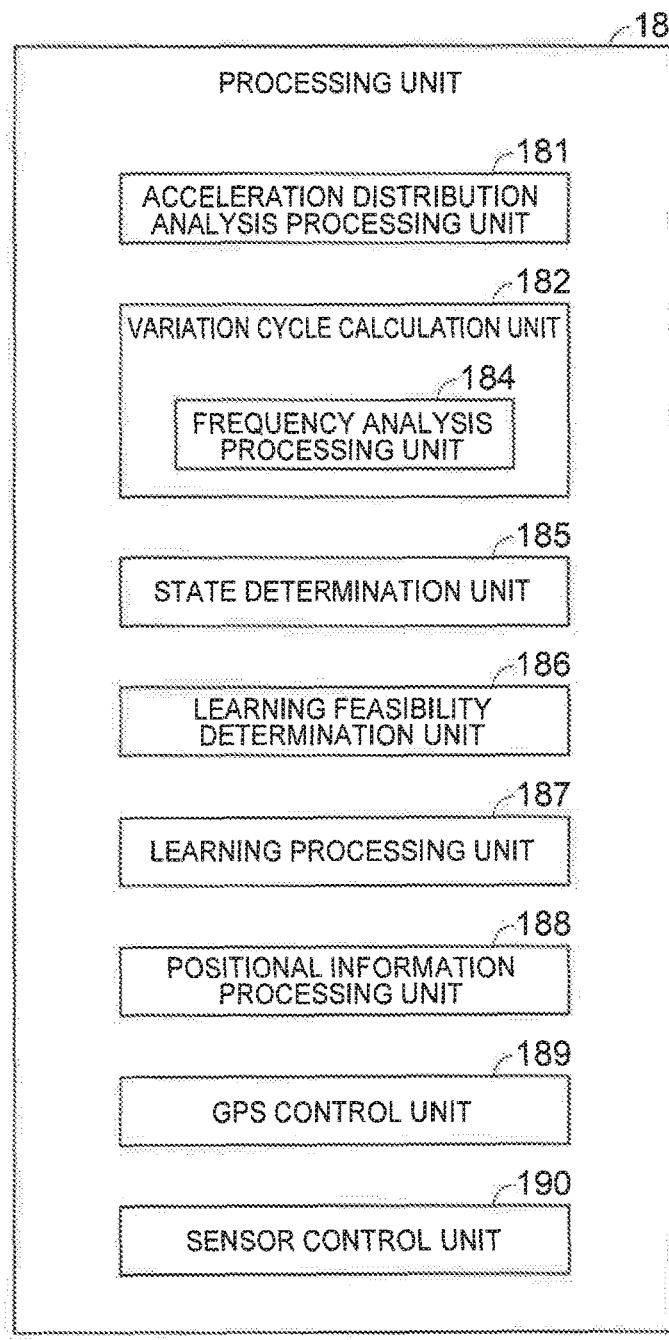
FIG. 3 is a block diagram illustrating a configuration example of a processing unit included in the running watch.

Next, a configuration of an exercise support system including a wearable device according to the invention will be described with reference to FIGS. 1, 2, and 3. FIG. 1 is a schematic configuration diagram illustrating an overview of the exercise support system. FIG. 2 is a block diagram illustrating a main configuration example of a running watch in an embodiment of the wearable device according to the invention. FIG. 3 is a block diagram illustrating a configuration example of a processing unit included in the running watch. Hereinafter, a running watch 100 will be exemplified as a wearable device including a position detection unit and a sensor unit. The running watch 100 is worn on a wrist of a user for use and measures and displays positional information, speed information, distance information, or the like of the user.

As illustrated in FIG. 1, an exercise support system 1000 according to the embodiment includes a running watch 100 which is a wearable device, a portable terminal device 600 which is an exercise support device, and an information processing device 700 connected to the portable terminal device 600 via a network NE.

The portable terminal device 600 can be configured with, for example, a smartphone or a tablet terminal device. The portable terminal device 600 is connected to the running watch 100 through short-range wireless communication or wired communication (not illustrated). The portable terminal device 600 can be connected to the information processing device 700 such as a personal computer (PC) or a server system via the network NE. Here, any of various networks such as a wide area network (WAN), a local area network (LAN), and short-range wireless communication can be used as the network NE. In this case, the information processing device 700 is realized as a processing storage unit that receives positional information, speed information, distance information, or the like of the user measured by the running watch 100 via the network NE and stores the information.

The running watch 100 may not necessarily be directly connected to the network NE as long as communication with the portable terminal device 600 is possible. Accordingly, it is possible to simplify the configuration of the running watch 100. Here, in the exercise support system 1000, it is also possible to realize a modification example in which the portable terminal device 600 is omitted and the running watch 100 and the information processing device 700 are directly connected to each other. In the case of this configuration, since measurement information of the running watch 100 can be directly transmitted to the information processing device 700 and an analysis result in the information processing device 700 can be received, it is possible to improve convenience for a user.

The invention is not limited to the exercise support system 1000 realized by the information processing device 700. For example, the exercise support system 1000 may also be realized by the portable terminal device 600. For example, in the portable terminal device 600 such as a smartphone, there are many restrictions on processing performance, a storage region, and a battery capacity compared to a server system. However, in consideration of a recent improvement in performance, sufficient processing performance or the like can also be considered to be ensured. Accordingly, when a request for the processing performance or the like is satisfied, the portable terminal device 600 can be realized as the exercise support system 1000 according to the embodiment.

The invention is not limited to the exercise support system 1000 realized by one device. For example, the exercise support system 1000 may include two or more devices of the running watch 100, the portable terminal device 600, and the information processing device 700. In this case, a process performed by the exercise support system 1000 may be performed by any one device or may be distributed to be processed by a plurality of devices. The exercise support system 1000 according to the embodiment may also include other devices different from the running watch 100 serving as a detection device, the portable terminal device 600 serving as an exercise support device, and the information processing device 700.

Further, when an improvement of terminal performance or a use form is considered, the exercise support system 1000 (the portable terminal device 600) according to the embodiment realized by the running watch 100 can be embodied.

The exercise support system 1000 according to the embodiment includes a memory that stores information (for example, a program or various kinds of data) and a processor that operates based on information stored in the memory. For example, a function of each unit may be realized with individual hardware or a function of each unit may be realized with an integrated hardware by the processor. The processor may also be, for example, a CPU. Here, the processor is not limited to a CPU and any of various processors such as a graphics processing unit (GPU) and a digital signal processor (DSP) can be used. The processor may be a hardware circuit configured with an ASIC. The memory may be, for example, a semiconductor memory such as a static random access memory (SRAM) or a dynamic random access memory (DRAM), may be a register, or a magnetic storage device such as a hard disk device, or may be an optical storage device such as an optical disc device. For example, the memory stores a command which can be read by a computer. When the command is performed by the processor, a function of each unit of the exercise support system 1000 is realized. Here, the command may be a command which is a set of commands of a program or may be a command that instructs a hardware circuit of the processor to operate.

1.2. Configuration of Wearable Device (Running Watch)

Next, a configuration example of the running watch 100 which is the wearable device according to the invention will be described with reference to FIG. 2. As illustrated in FIG. 2, the running watch 100 includes a GPS module 11 serving as a position detection unit, a sensor unit 12, an operation unit 13, a display unit 14, a sound output unit 15, a communication unit 16, a watch unit 17, a processing unit 18, and a storage unit 20.

The GPS module 11 serving as the position detection unit causes a GPS antenna 111 to receive a GPS satellite signal transmitted from a GPS satellite which is a kind of a positioning satellite and measures a position and a movement speed of a user carrying the GPS module 11 based on a navigation message such as trajectory information (ephemeris or almanac) of the GPS satellite superimposed and conveyed with the received GPS satellite signal to output the position and the movement speed of the user to the processing unit 18 at any time. Hereinafter, a movement speed measured by the GPS module 11 is referred to as a "GPS movement speed". The GPS module 11 according to the embodiment is connected to the GPS antenna 111 and includes an RF reception circuit unit 112, a memory unit 113 that stores data from the RF reception circuit unit 112, a baseband circuit unit 114 that processes the data from the RF reception circuit unit 112 and outputs a processing result, and an arithmetic unit 115 that calculates positional information using the processing result from the baseband circuit unit 114. The arithmetic unit 115 is not a requisite constituent. The processing unit 18 may acquire a processing result from the baseband circuit unit 114 and the processing unit 18 calculates positional information using the processing result.

The GPS antenna 111 is an antenna that receives a radio frequency (RF) signal including a GPS satellite signal transmitted from a GPS satellite. The GPS satellite signal is a signal subjected to spectrum modulation by a coarse/acquisition (C/A) code which is a kind of spread code and is superimposed on carrier waves with 1.57542 [GHz].

The RF reception circuit unit 112 down-converts the RF signal received by the GPS antenna 111 to a signal with an intermediate frequency (an intermediate frequency (IF) signal), amplifies the signal, subsequently converts the signal into a digital signal, and outputs the digital signal.

The memory unit 113 stores data of a received signal which is received by the RF reception circuit unit 112 and is converted into digital data.

The baseband circuit unit 114 captures and tracks a GPS satellite signal using the data of the received signal stored in the memory unit 113. The arithmetic unit 115 calculates a position of the GPS antenna 111, that is, a position of a user carrying the running watch 100, and a movement speed or a watch error using time information acquired from the captured GPS satellite signal, distance information between the GPS satellite and the GPS antenna 111 of the running watch 100 and satellite trajectory information or the like. The arithmetic unit 115 calculates the positional information using the processing result (measurement) from the baseband circuit unit 114.

The sensor unit 12 detects data of a movement direction of the user, a speed, a distance, and an altitude and acquires the data as movement direction information, speed information, distance information, and altitude information. The sensor unit 12 according to the embodiment includes three sensors, an acceleration sensor 121, a geomagnetic sensor 122, and an atmospheric pressure sensor 123. The sensor unit 12 may have a configuration in which at least one of the acceleration sensor 121, the geomagnetic sensor 122, and the atmospheric pressure sensor 123 is not included or may have a configuration in which another sensor such as a biological sensor such as a pulse wave sensor, or an angular velocity (gyro) sensor is included.

The acceleration sensor 121 detects an acceleration vector of the user. For example, a micro electro mechanical systems (MEMS) sensor is used as the acceleration sensor 121. The acceleration vector detected by the acceleration sensor 121 is output as a detected acceleration signal to the processing unit 18.

The geomagnetic sensor 122 can measure a direction of a magnetic field of the geomagnetism. Then, measured data measured by the geomagnetic sensor 122 can be output as a signal to the processing unit 18 and can be set to movement direction information (azimuth information) of the user.

The atmospheric pressure sensor 123 can acquire atmospheric pressure data related to a present position of the user. Then, the atmospheric pressure data acquired by the atmospheric pressure sensor 123 can be output as a signal to the processing unit 18 and an altitude (elevation) of the present position of the user can be set as information.

The operation unit 13 is realized by an input device such as a touch panel or various switches such as a button switch, a lever switch, a dial switch and outputs an operation signal according to an operation input to the processing unit 18.

The display unit 14 is realized by a display device such as a liquid crystal display (LCD) or an electroluminescence display (ELD) and displays various screens based on display signals input from the processing unit 18.

The sound output unit 15 is realized by a sound output device such as a speaker and outputs various sounds based on a sound signal input from the processing unit 18.

The communication unit 16 is a communication device that transmits and receives information used inside the device to and from the external information processing device 700 or the like under the control of the processing unit 18. As a communication scheme of the communication unit 16, any of various schemes such as a format in which wired connection is made via a cable in conformity with a predetermined communication standard, a format in which connection is made via an intermediate device also used as a charger called a cradle, and a format in which wireless connection is made using wireless communication can be applied. For example, positional information, speed information, distance information, or the like of the user measured by the running watch 100 is transmitted to a personal computer (PC) via the communication unit 16 and browsing of the positional information, the speed information, the distance information, or the like or management of data is appropriately performed in the PC.

The watch unit 17 is an internal watch of the running watch 100 and is formed from a quartz crystal oscillator including a quartz crystal resonator and an oscillation circuit. A measured time measured by the watch unit 17 is output to the processing unit 18 at any time.

The processing unit 18 is realized by a control device and an arithmetic device such as a microprocessor such as a central processing unit (CPU) or a digital signal processor (DSP) and an application specific integrated circuit (ASIC) and integrally controls each unit of the running watch 100. The processing unit 18 is electrically connected to the GPS module 11 and the sensor unit 12 and determines a behavior state of the user based on signals from the GPS module 11 and the sensor unit 12. Then, the positional information of the user (present positional information) can be obtained by controlling, for example, activating or stopping (deactivating) at least two of the GPS module 11, the acceleration sensor 121, the geomagnetic sensor 122, and the atmospheric pressure sensor 123 based on the determined behavior state. Here, the behavior state of the user includes a state in which the user is moving in the same direction, that is, the user is performing a linear exercise (linear movement), a state in which the user is moving while changing a traveling direction by a set reference value or more, that is, a state in which the user is moving a different direction from the previous direction (a curve movement or a behavior involving a direction change), a state in which the user transitions from a stop state to an exercise state, a state in which the user transitions from an exercise state to a stop state, and a state in which a movement speed of the user is changed. A kind of behavior determined based on signals from the GPS module 11 and the sensor unit 12 and performed by the user may be included in the behavior state. A kind of behavior is, for example, a kind of behavior of the user such as walking, running, sleeping, swimming, bicycling or information indicating a sports event performed by the user.

As illustrated in FIG. 3, the processing unit 18 includes an acceleration distribution analysis processing unit 181, a variation cycle calculation unit 182, a state determination unit 185, a learning feasibility determination unit 186, a learning processing unit 187, a positional information processing unit 188, a GPS control unit 189, and a sensor control unit 190. Each unit included in the processing unit 18 may be configured with hardware such as a dedicated module circuit.

The acceleration distribution analysis processing unit 181 performs an acceleration distribution analysis process to be described below (see FIG. 6) and acquires first main component data (hereinafter appropriately referred to as "PCA1"), second main component data (hereinafter appropriately referred to as "PCA2"), and eigenvectors based on detected acceleration. For example, one of the first main component data and the second main component data which are main component analysis results of the detected acceleration corresponds to a vertical movement direction component of the body of the user and the other thereof corresponds to an arm swing direction component.

The variation cycle calculation unit 182 performs, for example, a process to obtain a frequency as a variation cycle of a step operation equivalent to the number of steps (a pitch) at which the user treads per unit time. Here, in the embodiment, there are several kinds of "frequencies" serving as the variation cycle in accordance with a difference in a calculation method. For example, there is a method of calculating the frequency using frequency analysis such as FFT or autocorrelation. It is possible to calculate with further improved precision by using a method of calculating the frequency using maximum likelihood estimation.

The variation cycle calculation unit 182 includes a frequency analysis processing unit 184. The frequency analysis processing unit 184 performs, for example, an autocorrelation process to be described below as the frequency analysis process and acquires a frequency (a first variation cycle) and power (a first variation strength) of PCA1 and a frequency (a second variation cycle) and power (a second variation strength) of PCA2.

The state determination unit 185 determines a behavior state of the user and a kind of behavior of the user, such as a linear movement and a curve movement based on signals from the GPS module 11 and the sensor unit 12. When the state determination unit 185 determines a predetermined direction change in the determination of the behavior state, the state determination unit 185 transmits a determination signal to the GPS control unit 189 and the sensor control unit 190 in accordance with the determined kind of behavior. The "predetermined direction change" in the determination of the behavior state refers to a case in which the magnitude of a set direction change is set as a reference value and a direction change greater than a reference value occurs. The state determination unit 185 performs a state determination process to determine a user state as "running", "walking", or "a state other than a movement exercise state" based on a value indicated by a frequency (a first frequency) of PCA1 and a frequency (a second frequency) of PCA2 with regard to a frequency threshold set in advance.

The learning feasibility determination unit 186 performs a learning feasibility determination process to be described below to determine whether learning is feasible based on a signal strength of a GPS satellite signal and a user state. The learning feasibility determination unit 186 is assumed to learn correlation between a positioning result of the GPS module 11 and an output of the sensor unit 12 while the GPS module 11 is operating and the sensor unit 12 is operating. By performing the learning in this case, it is possible to improve estimation precision of positional information by the sensor unit 12.

The learning processing unit 187 performs a learning process when the learning feasibility determination unit 186 determines that the user state can be learned. Specifically, the learning processing unit 187 derives an estimation relation expression of the positional information based on the positional information of GPS, a frequency (variation cycle) of at least one of the first main component direction and the second main component direction, and a signal from the sensor unit 12.

When the user is moving in the same direction in the determination of the behavior state or there is no change in the determined kind of behavior, the positional information processing unit 188 estimates positional information with previous positional information and a signal of the acceleration sensor 121 of the sensor unit 12. When a change in the movement direction of the user is detected in the determination of the behavior state or there is a change in the determined kind of behavior, detailed positional information is acquired based on the signal from the activated GPS module 11.

When the GPS control unit 189 determines the predetermined direction change in the determination of the behavior state, the GPS control unit 189 receives the determination signal transmitted from the state determination unit 185 in accordance with the determined kind of behavior and performs a control process such as activation or stopping of the GPS module 11.

Specifically, when the user is moving in the same direction in the determination of the behavior state or there is no change in the determined kind of behavior, the GPS control unit 189 stops the GPS module 11 of which power consumption is large. When the predetermined direction change of the user is detected in the determination of the behavior state, that is, the user is determined to be moving in a different direction from the previous direction, or there is a change in the determined kind of behavior, the GPS control unit 189 activates the GPS module 11 to acquire the detailed positional information.

When the sensor control unit 190 determines the predetermined direction change in the determination of the behavior state, the sensor control unit 190 receives a determination signal transmitted from the state determination unit 185 in accordance with the determined kind of behavior and performs a control process such as activation or stopping of the acceleration sensor 121, the geomagnetic sensor 122, and the atmospheric pressure sensor 123 of the sensor unit 12.

Specifically, when the user is moving in the same direction in the determination of the behavior state or there is no change in the determined kind of behavior, the sensor control unit 190 activates one of the acceleration sensor 121, the geomagnetic sensor 122, and the atmospheric pressure sensor 123. More specifically, it is possible to activate, for example, the acceleration sensor 121 and estimate positional information of the user in a stop state of the GPS module 11 from a movement speed or the like measured by the acceleration sensor 121. When the predetermined direction change of the user is detected in the determination of the behavior state, that is, the user is determined to be moving in a different direction from the previous direction, or there is a change in the determined kind of behavior, the sensor control unit 190 stops the activated acceleration sensor 121, geomagnetic sensor 122, and the atmospheric pressure sensor 123. More specifically, for example, the acceleration sensor 121 activated to estimate the positional information of the user in the stop state of the GPS module 11 is stopped.

The storage unit 20 is realized by any of various integrated circuit (IC) memories such as read-only memory (ROM), a flash ROM, and a random access memory (RAM) or a storage medium such as a hard disk. The storage unit 20 stores a program operating the running watch 100 to realize various functions of the running watch 100 and data or the like used during execution of the program in advance or stores temporarily the data in each process.

The storage unit 20 stores a position estimation program 21 causing the processing unit 18 to function as the acceleration distribution analysis processing unit 181, the variation cycle calculation unit 182, the state determination unit 185, the learning feasibility determination unit 186, the learning processing unit 187, the positional information processing unit 188, the GPS control unit 189, and the sensor control unit 190 and performing a process of estimating a present position of the user.

The storage unit 20 stores analysis result data 22, a movement direction estimation program 23, histogram data 24, a behavior state determination program 25, learning data 26, a kind-of-behavior determination program 27, and positional information data 28.

The analysis result data 22 includes previous data 221 and current data 223. The position estimation process is performed repeatedly at an interval of 1 second. As the previous data 221, the first main component data (PCA1), the second main component data (PCA2), eigenvectors, and the like acquired previously (before 1 second) by the acceleration distribution analysis processing unit 181 are stored. As the current data 223, the first main component data (PCA1), the second main component data (PCA2), eigenvectors, and the like currently acquired by the acceleration distribution analysis processing unit 181 are stored.

The movement direction estimation program 23 is stored as a processing program for estimating a movement direction (traveling direction) of the user from a signal from the GPS module 11 and main component data acquired by analyzing main components of output data of the geomagnetic sensor 122.

As the histogram data 24, a histogram of the frequency (the first variation cycle) of PCA1 and the frequency (the second variation cycle) of PCA2 collected during a repeated process of estimating the positional information is stored.

The behavior state determination program 25 is stored as a processing program of determining a behavior state of the user based on signals from the GPS module 11 and the sensor unit 12. The behavior state of the user according to the embodiment includes a linear movement when the user is moving in the same direction or a curve movement when the predetermined direction change of the user is detected.

The learning data 26 is collected during the repeated process of estimating the positional information. Then, the learning data 26 is referred to when the learning processing unit 187 learns and updates the estimation relation expression of the positional information.

The kind-of-behavior determination program 27 is stored as a program determining a kind of behavior of the user based on a body movement period included in the behavior state. Here, the body movement period can be rephrased as a period of a movement of the body related to walking, running, or the like of the user and can be expressed by, for example, a walking time per step (600 ms/step) or the number of steps per minute (100 steps/minute).

The positional information data 28 chronologically stores positional information (present positional information) of the user output whenever the positional information processing unit 188 performs a process of calculating the positional information.

1.3. Method of Controlling Wearable Device (Running Watch)

Figure 4A:
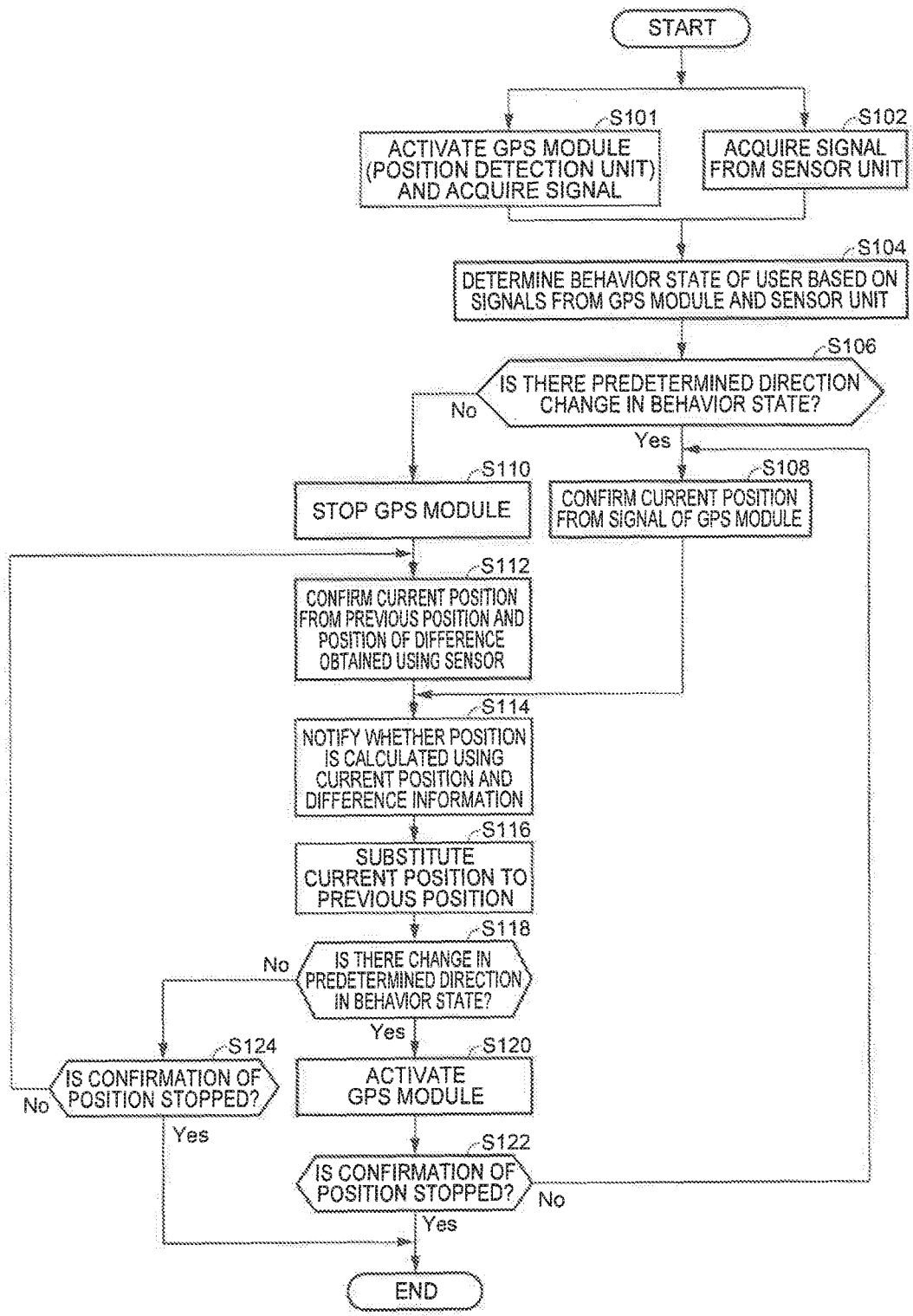
FIG. 4A is a flowchart illustrating an acquisition processing procedure of positional information related to the running watch.
Figure 4B:
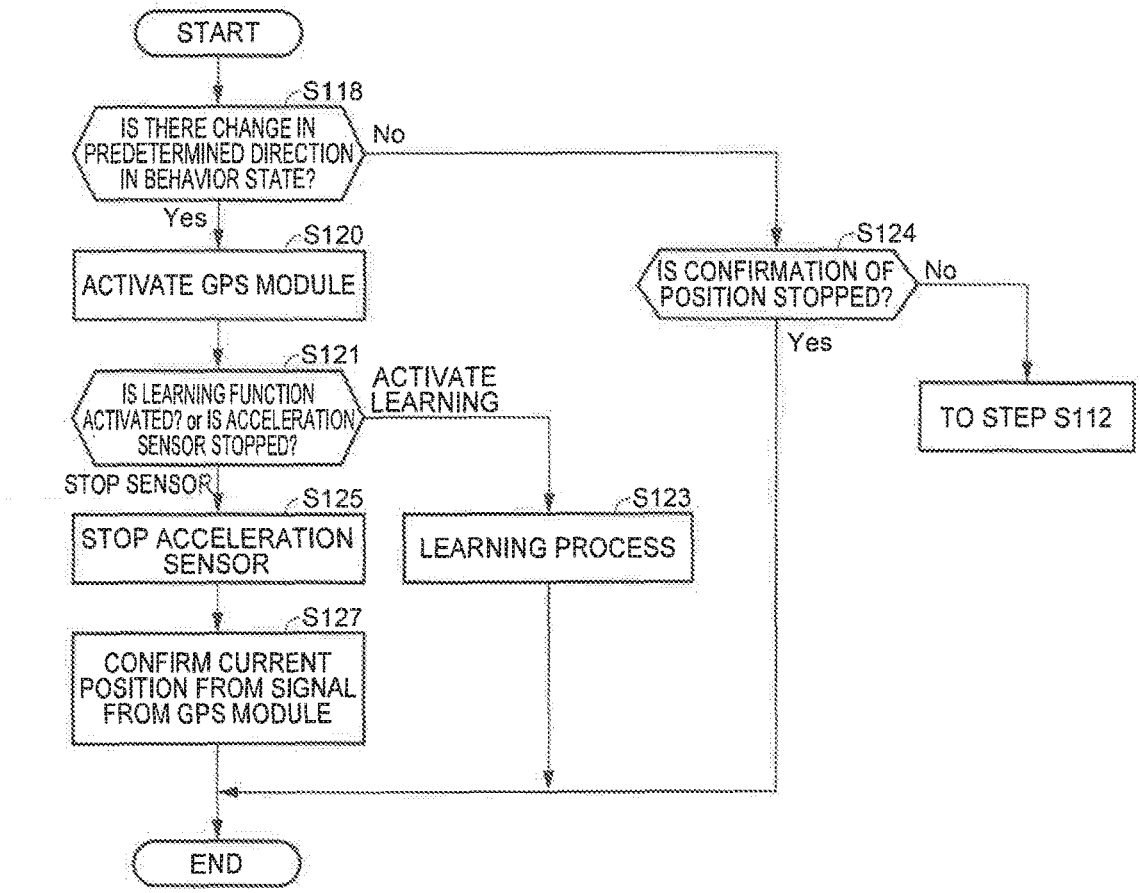
FIG. 4B is a flowchart illustrating an application example of an acquisition procedure of the positional information.
Figure 5:
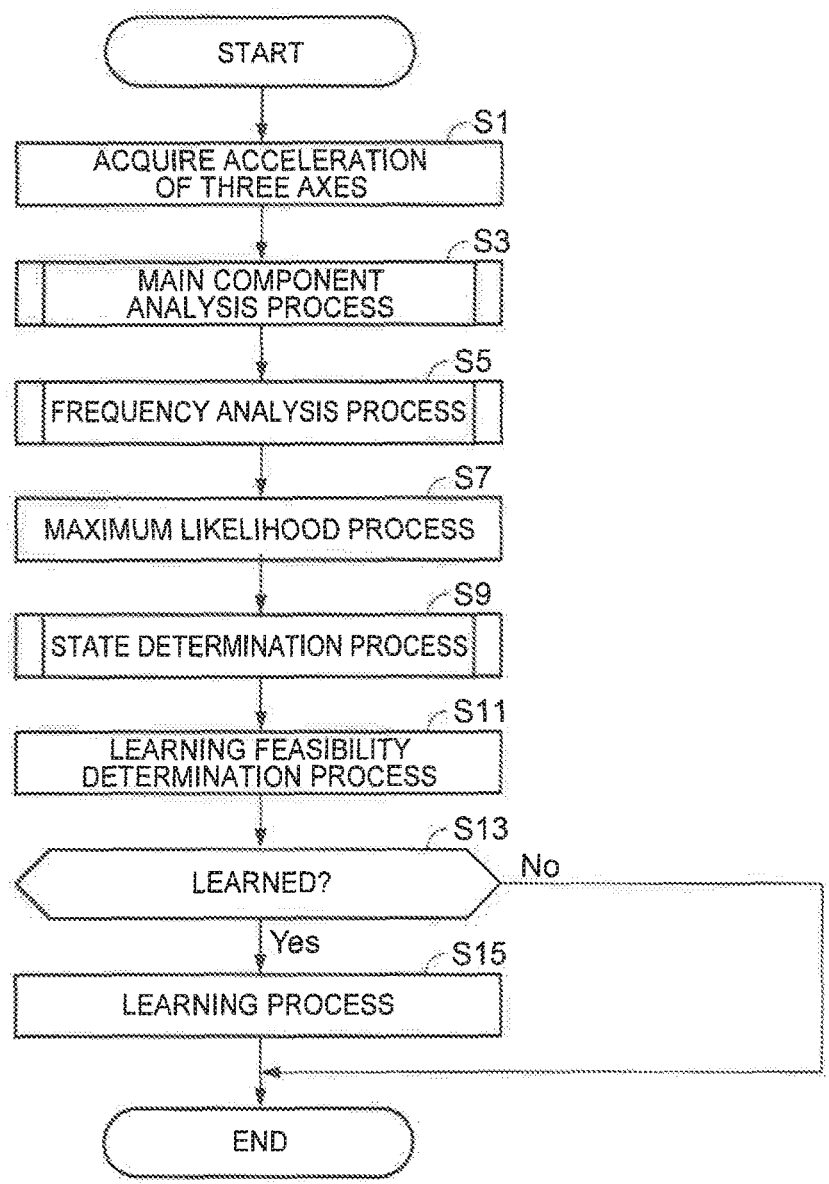
FIG. 5 is a flowchart illustrating a processing procedure in which a main component analysis process is used.
Figure 6:
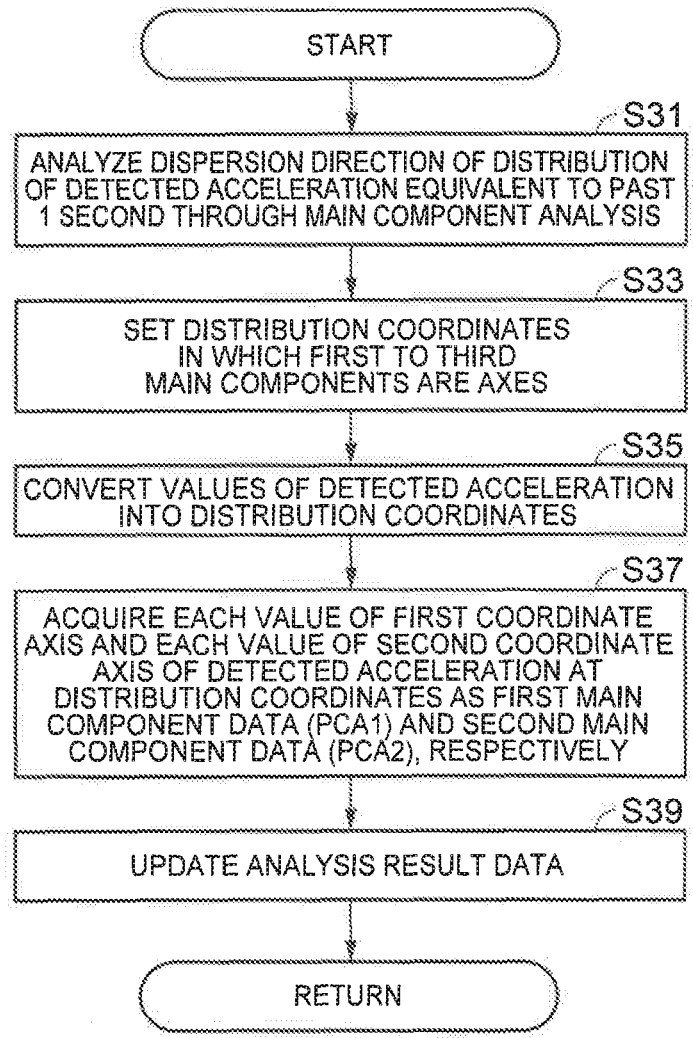
FIG. 6 is a flowchart illustrating a processing procedure of an acceleration distribution process.
Figure 7:
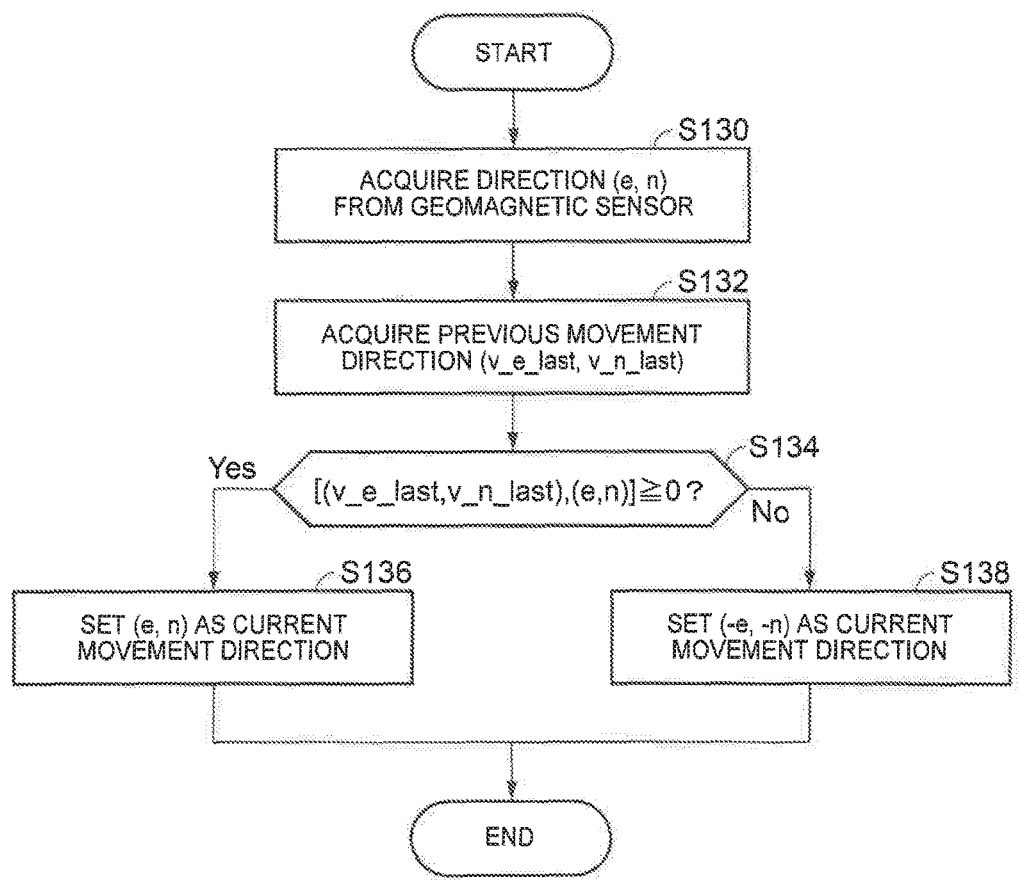
FIG. 7 is a flowchart illustrating an example of a calculation process in a movement direction by a geomagnetic sensor.
Figure 8:
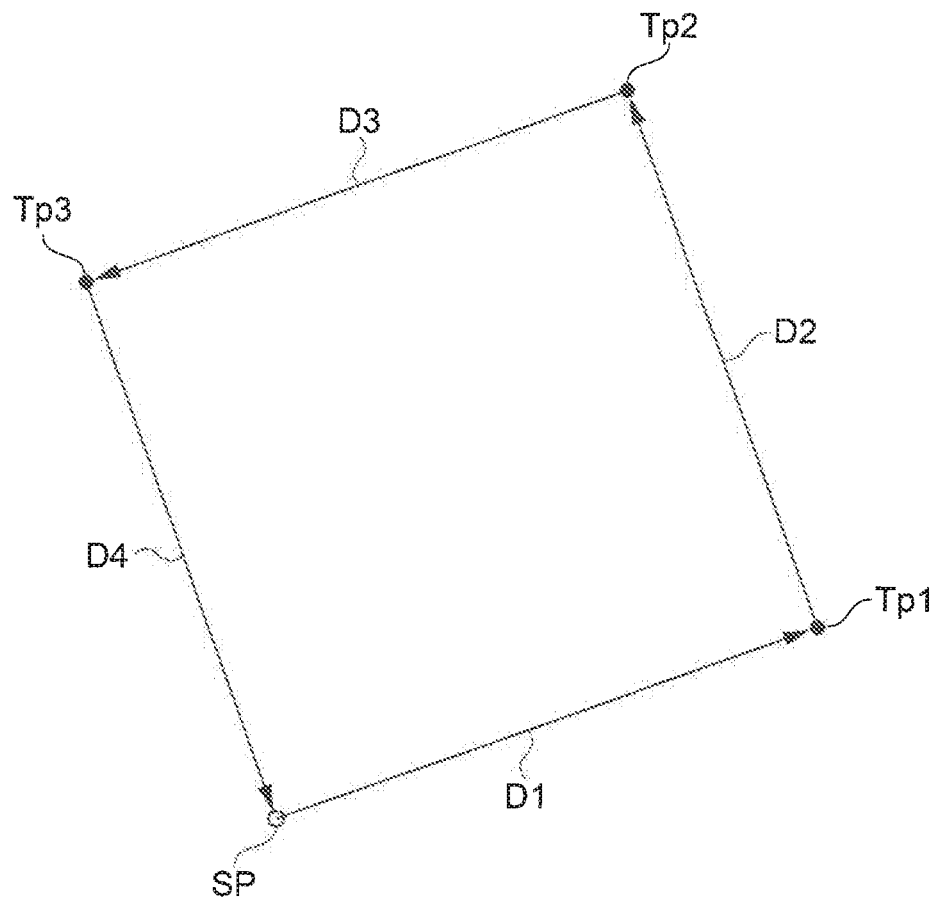
FIG. 8 is a diagram illustrating a movement example related to estimation of a movement direction.
Figure 9A:
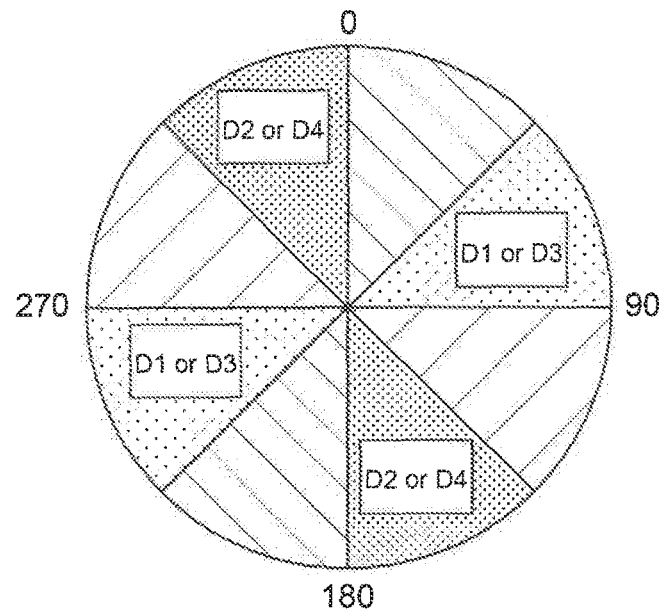
FIG. 9A is a conceptual diagram illustrating an estimation course of a movement direction.
Figure 9B:
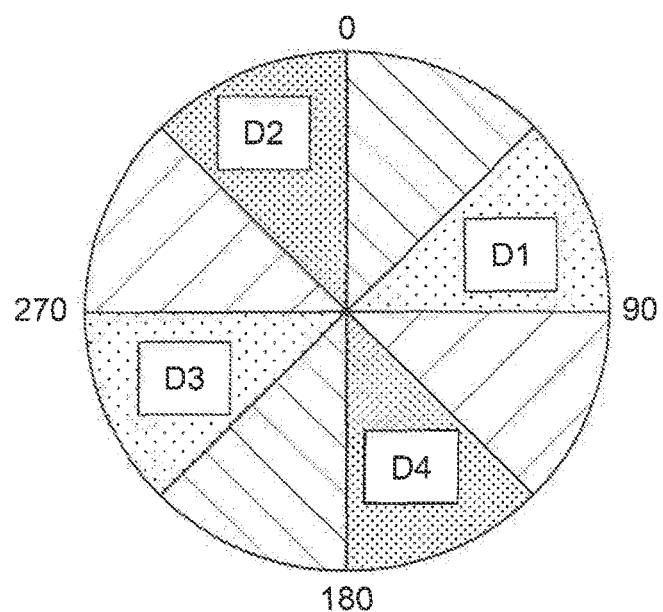
FIG. 9B is a conceptual diagram illustrating an estimation result of a movement direction.
Figure 10:
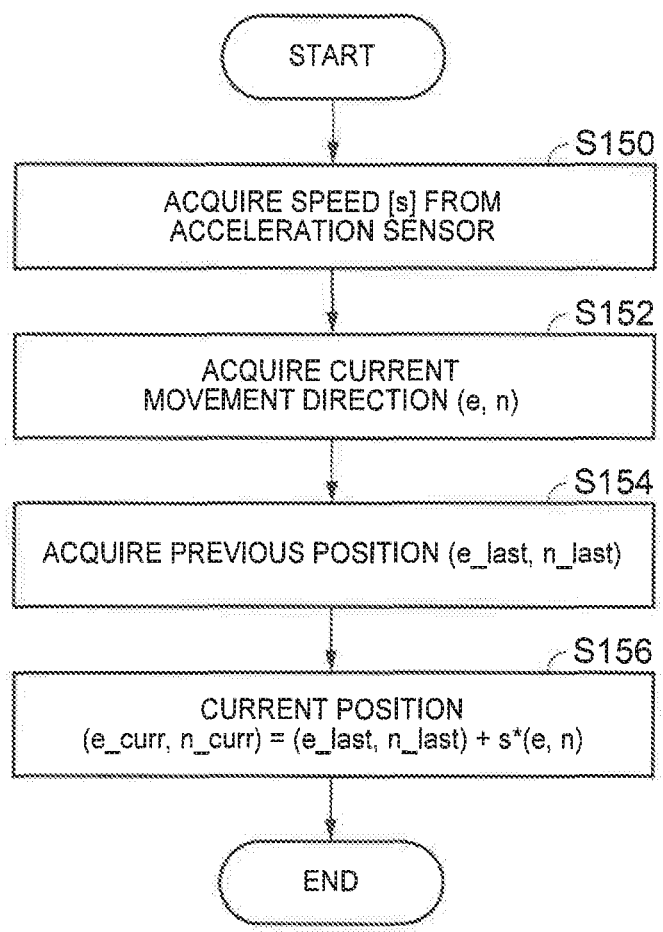
FIG. 10 is a flowchart illustrating an example of a calculation process for a position of a difference by an acceleration sensor.
Figure 11:
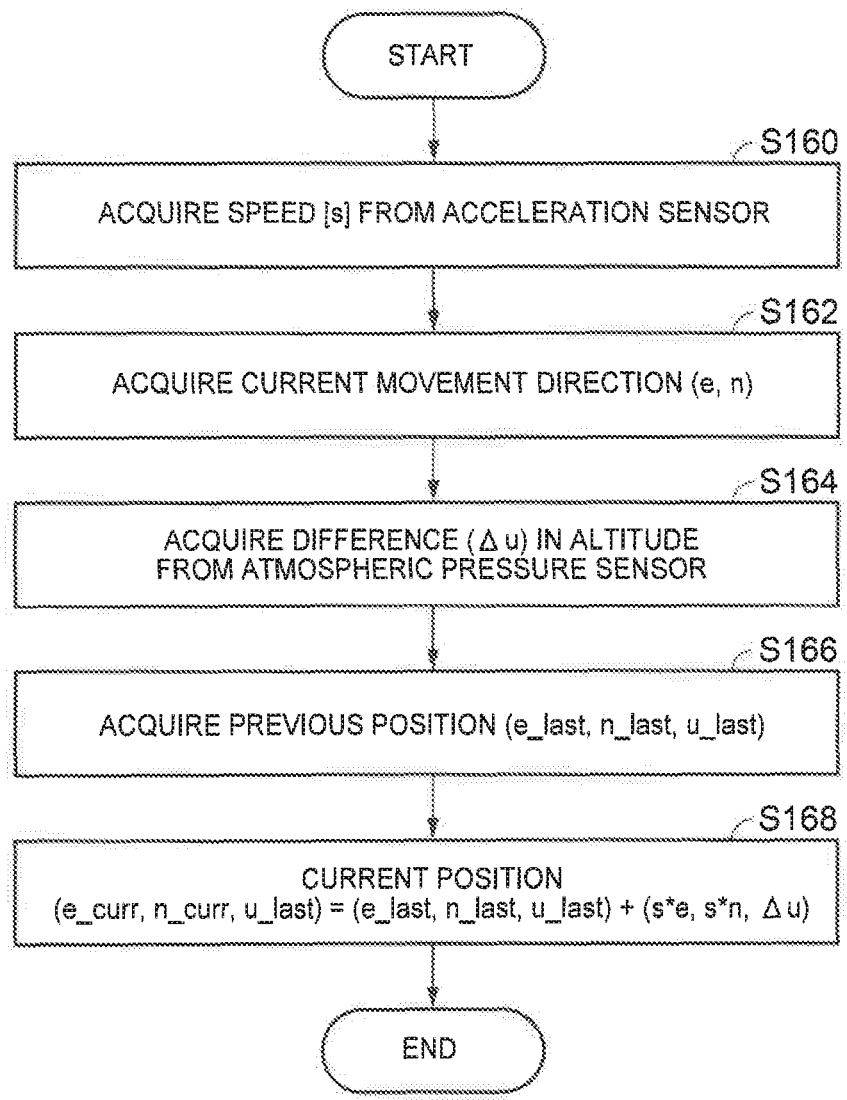
FIG. 11 is a flowchart illustrating an example of a calculation process for an altitude in an altitude direction by an atmospheric pressure sensor.

Next, a method of controlling the running watch 100 which is a wearable device will be described with reference to FIGS. 4A to 11. FIG. 4A is a flowchart illustrating an acquisition processing procedure of positional information related to the running watch. FIG. 4B is a flowchart illustrating an application example of an acquisition procedure of the positional information. FIG. 5 is a flowchart illustrating a processing procedure in which a main component analysis process is used. FIG. 6 is a flowchart illustrating a processing procedure of an acceleration distribution process. FIG. 7 is a flowchart illustrating an example of a calculation process in a movement direction by a geomagnetic sensor. FIG. 8 is a diagram illustrating a movement example related to estimation of a movement direction. FIG. 9A is a conceptual diagram illustrating an estimation result of a movement direction. FIG. 9B is a conceptual diagram illustrating an estimation result of a movement direction. FIG. 10 is a flowchart illustrating an example of a calculation process for a position of a difference by an acceleration sensor. FIG. 11 is a flowchart illustrating an example of a calculation process for an altitude in an altitude direction by an atmospheric pressure sensor. In description of the following procedure, the same reference numerals as the reference numerals used to describe the configurations of the exercise support system 1000 and the running watch 100 described above are applied for the description.

The method of controlling the running watch 100 according to the invention includes: determining an behavior state of the user based on signals from the GPS module 11 serving as the position detection unit and the sensor unit 12 including at least one of the acceleration sensor 121, the geomagnetic sensor 122, and the atmospheric pressure sensor 123; controlling at least two of the GPS module 11, the acceleration sensor 121, the geomagnetic sensor 122, and the atmospheric pressure sensor 123 based on the determined behavior state; and acquiring positional information. The processing procedure described herein can be realized when the processing unit 18 reads the position estimation program 21 from the storage unit 20 and executes the position estimation program 21. The running watch 100 confirms or estimates the position of the user by performing the process in accordance with the processing procedure of FIG. 4A.

Hereinafter, the method of controlling the running watch 100 will be described with reference to FIG. 4A. Here, the acquisition processing procedure of the positional information illustrated in FIG. 4A starts, for example, when a measurement start operation is performed by the user through the operation unit 13. Until a measurement end operation is performed, the processes of steps S101 to S124 are performed repeatedly at a predetermined period, for example, at an interval of 1 second. When the measurement start operation is performed, measurement of a present position or the like by the GPS module 11, detection of acceleration detected by the acceleration sensor 121, detection of a movement direction by the geomagnetic sensor 122, and the like start and are performed in parallel until the acquisition processing procedure of the positional information ends. In the processing procedure, the description of a process related to the atmospheric pressure sensor 123 is omitted. The processing procedure in which the atmospheric pressure sensor 123 is used will be described later.

A detection result signal is output from the acceleration sensor 121 or the geomagnetic sensor 122 at any time. The processing unit 18 samples and takes the detection result signal as detected acceleration data or detection azimuth data at a predetermined sampling rate, and the detection azimuth data is used for a position estimation process and control of the GPS module 11. The sampling rate can be, for example, 32 samples per second. Of course, another sampling rate may be used.

The user wearing the running watch 100 on his or her wrist performs a measurement start operation through the operation unit 13, and then a series of processing procedure is started by the measurement start operation. As illustrated in FIG. 4A, the processing unit 18 first activates the GPS module 11 serving as the position detection unit and acquires a satellite signal (step S101). Then, the processing unit 18 acquires a signal related to acceleration data by the acceleration sensor 121 included in the sensor unit 12 and a signal related to movement direction data by the geomagnetic sensor 122 (step S102).

Subsequently, the processing unit 18 determines a behavior state of the user based on signals from the GPS module 11, the acceleration sensor 121, and the geomagnetic sensor 122 (step S104). A method of determining the behavior state of the user (a determination procedure) will be described later.

Here, in the positional information calculated using the GPS module 11, a Doppler frequency is used when a GPS satellite signal is received. Therefore, when a reception environment of the GPS satellite signal such as an area of buildings or a forest is bad, an error may increase and a correct position may consequently deviate. For example, when a movement speed is obtained by the acceleration sensor 121 and the detected acceleration is time-integrated, it is assumed that there is no movement or a small movement of the user. Therefore, for example, it is difficult to calculate a correct speed in walking or running involving a movement due to landing. Further, it is further difficult to calculate a correct speed when the running watch 100 is worn on a limb involving swing of an arm or backward and forward movement of a leg.

To solve such a problem, in the embodiment, a processing procedure to which the main component analysis process illustrated in FIG. 5 is applied is used in the processing procedure. Hereinafter, the processing procedure to which the main component analysis process is applied will be described with reference to FIGS. 5 and 6.

In the processing procedure illustrated in FIG. 5, acceleration in each axial direction of three axes (x, y, z) is first acquired by the acceleration sensor 121 (step S1). Subsequently, the acceleration distribution analysis processing unit 181 performs an acceleration distribution analysis process. Specifically, a distribution of detected acceleration in a coordinate (sensor coordinate) space corresponding to axial directions (x, y, z) of the acceleration sensor 121 is analyzed and main component analysis is performed to extract a direction of the distribution of principal components (main component) (step S3). For example, when two high-order main components are focused on in the direction of the main components, a maximum dispersion direction in which expansion of the distribution is largest can be extracted as a first main component and a dispersion direction which intersects (for example, is orthogonal to) the maximum dispersion direction and in which expansion of the distribution is next largest can be extracted as a second main component. Thus, the first main component data (PCA1) and the second main component data (PCA2) which are main component data in the dispersion directions can be obtained. Here, in addition to the main component analysis, an acceleration distribution analysis process is performed using independent component analysis which is a calculation scheme for separation into a plurality of additive components.

FIG. 6 is a flowchart illustrating a processing procedure of an acceleration distribution analysis process. As illustrated in FIG. 6, in the acceleration distribution analysis process, the acceleration distribution analysis processing unit 181 analyzes a dispersion direction of a distribution of detected acceleration equivalent to 32 samples for past 1 second through main component analysis (step S31). Since the details of the main component analysis are known in the related art, the description thereof will be omitted. In the embodiment, three main components are extracted using a direction perpendicular to the first and second main components illustrated in FIG. 6 as a third main component (a component other than the vertical movement direction component and the arm swing detection component), and an eigenvalue and an eigenvector of each of the main components are calculated.

Then, through the main component analysis, the acceleration distribution analysis processing unit 181 sets distribution coordinates in which a direction of the first main component is a first coordinate axis, a direction of the second main component is a second coordinate axis, and a direction of the third main component is a third coordinate axis (step S33), converts the values of the detected acceleration into the distribution coordinates (step S35), and acquires each value of the first coordinate axis and each value of the second coordinate axis of the detection acceleration at the distribution coordinates as the first main component data (PCA1) and the second main component data (PCA2), respectively (step S37).

Thereafter, the acceleration distribution analysis processing unit 181 updates the analysis result data 22 as current data 223 including at least the first main component data (PCA1), the second main component data (PCA2), and the eigenvector (step S39). In the speed estimation process subsequent to the second time, the acceleration distribution analysis processing unit 181 updates the analysis result data 22 using the current data 223 before the update as the previous data 221.

As described above, in the acceleration distribution analysis process described with reference to FIG. 6, the vertical movement direction component and the arm swing direction component of the body can be separated and extracted from the detected acceleration. Thus, the components can be used in a subsequent process except for an excepted component (the third main component) unrelated to a running way, a walking way, or an arm swing way included in the values of the detected acceleration. In this way, in the subsequent process, it is not necessary to be aware of the axis directions (x, y, z) of the acceleration sensor 121. Thus, an estimation movement speed can be calculated without being affected by a mounting state such as a mounting direction of the running watch 100.

FIG. 5 is referred back to for description. When the acceleration distribution analysis process (the main component analysis process) of step S3 ends, the frequency analysis processing unit 184 subsequently performs the frequency analysis process (step S5). In the process herein, the first main component data (PCA1) and the second main component data (PCA2) of past 2 seconds stored in the analysis result data 22 as the previous data 221 and the current data 223 are used.

As described above, the first main component data (PCA1) and the second main component data (PCA2) are periodically changed at a variation cycle of an operation in the corresponding first main component direction and an operation of the corresponding second main component direction. Accordingly, for example, when the first main component data (PCA1) is focused on, its frequency can be obtained by detecting peaks of a plurality of period variation waveforms and calculating an average value of times between the plurality of peaks. However, since other peaks appear in an actual period variation waveform in addition to the peaks in the period variation, the peaks are causes of erroneous detection.

To reduce the erroneous detection, a method of lengthening a time length of the first main component data (PCA1) or the second main component data (PCA2) subjected to the peak detection is considered. Not only may trackability of a time change such as a pitch be damaged, but also power in the first main component direction or the second main component direction may not be specified from the period variation waveform of the first main component data (PCA1) or the like. Accordingly, the frequency analysis processing unit 184 performs the frequency analysis process to acquire a frequency and power from the first main component data (PCA1) and the second main component data (PCA2) equivalent to past 2 seconds. The frequency analysis process can be performed using, for example, autocorrelation process.

When the autocorrelation process is performed, a whole shape of the period variation waveform in which only periodicity of the first main component data (PCA1) appears as a peak can be obtained. Accordingly, by performing peak detection on an autocorrelation process result, it is possible to calculate the frequency (first variation cycle) of PCA1 from a time between the peaks. The frequency analysis processing unit 184 further acquires a maximum value of a correlation value as a power (the first variation strength) of autocorrelation from the autocorrelation process result of the first main component data (PCA1). For the second main component data (PCA2), the frequency analysis processing unit 184 also performs the peak detection on the autocorrelation process result in the same way and calculates the frequency (second variation cycle) and power (second variation strength) of PCA2.

The autocorrelation process can be substituted with a process in which predetermined frequency analysis and predetermined inverse frequency analysis, for example, a process in which a fast Fourier transform (FFT) process and an inverse FFT process is used. Power of the vertical movement direction (FFT maximum power of PCA1) and power of an arm swing direction (FFT maximum power of PCA2) can be acquired from the FFT processing result. It is possible to reduce a calculation amount and accelerate the process using the FFT process and the inverse FFT process.

In the autocorrelation process, the frequency analysis processing unit (herein, the autocorrelation processing unit) 184 first reads the first main component data (PCA1) from the previous data 221 and the current data 223 with reference to the analysis result data 22 and sets the first main component data (PCA1) equivalent to past 2 seconds as a processing target. Subsequently, the frequency analysis processing unit (herein, the autocorrelation processing unit) 184 performs the FFT process on the first main component data (PCA1) equivalent to past 2 seconds and set as the processing target.

Subsequently, the frequency analysis processing unit (herein, the autocorrelation processing unit) 184 performs the inverse FFT process on the above-described FFT process result. Then, the frequency analysis processing unit (herein, the autocorrelation processing unit) 184 performs the peak detection on the inverse FFT process result to acquire the frequency (the first variation cycle) of PCA1 and the power (the first variation strength) of the autocorrelation.

Thereafter, the frequency analysis processing unit (herein, the autocorrelation processing unit) 184 reads the second main component data (PCA2) from the previous data 221 and the current data 223 with reference to the analysis result data 22 and sets the second main component data (PCA2) equivalent to past 2 seconds as a processing target. Then, the frequency analysis processing unit (herein, the autocorrelation processing unit) 184 performs the FFT process on the second main component data (PCA2) equivalent to past 2 seconds set as the processing target in the above-described same way and performs the inverse FFT process on the FFT process result. Then, the frequency analysis processing unit (herein, the autocorrelation processing unit) 184 performs the peak detection on the inverse FFT process result and acquires the frequency (the variation cycle) of PCA2.

Before the inverse FFT process, a frequency deviating from a frequency domain assumed as a first main component direction component or a second main component direction component may be cut. In this way, it is possible to improve precision of the autocorrelation process.

In the above-described frequency analysis process (the autocorrelation process), the frequency (the first variation cycle) of PCA1 and the frequency (the second variation cycle) of PCA2 can be acquired without being erroneously calculated. Accordingly, it is consequently possible to improve calculation precision of an estimated movement speed to be described below. The correlation values can be acquired as the power (first and second variation strengths) of PCA1 and PCA2.

FIG. 5 is referred back to for description. When the frequency analysis process of step S5 ends, the variation cycle with higher likelihood can subsequently be calculated by using the maximum likelihood method (step S7). Subsequently, the state determination unit 185 performs a state determination process of determining the exercise state of the user (step S9). In the state determination process, the state determination unit 185 determines whether the user state is "running" or "walking" which is a movement exercise state or a "state other than the movement exercise state".

Here, in the determination, a predetermined threshold is determined and it can be determined that the user state is "running" when both the frequency of PCA1 and the frequency of PCA2 exceed the threshold. When one of the frequency of PCA1 and the frequency of PCA2 exceeds the threshold and the other frequency is equal to or less than the threshold, it can be determined that the user state is "walking". When both of the frequency of PCA1 and the frequency of PCA2 are less than the threshold, it can be determined that the user state is the "state other than the movement exercise state" which is not "running" or "walking".

When the state determination process of step S9 ends, the learning feasibility determination unit 186 subsequently performs the learning feasibility determination process (step S11). For example, the learning feasibility determination unit 186 processes a signal strength of a GPS satellite signal received through the GPS antenna 111 by the GPS module 11 using a threshold. When the signal strength is equal to or less than the predetermined threshold, it is determined that the learning is unfeasible. Then, the learning feasibility determination unit 186 confirms the operation status of the sensor unit 12 and performs the learning when the sensor unit 12 is operating. That is, the GPS module 11 and the sensor unit 12 are operating and the learning is performed in a state in which the signal strength of the received GPS satellite signal is sufficient. In a learning process at the rear stage, a GPS movement speed is used for learning update of a movement speed relation expression for walking or running corresponding to the user state determined in the above-described state determination process. When the signal strength of the GPS satellite signal is weak, reliability of the GPS satellite signal is lowered, and thus the learning is assumed to be unfeasible. Herein, the process can be realized by setting an index value indicating the reliability of the signal strength of the GPS satellite signal and setting a predetermined threshold in advance as a low reliability condition. In addition, in the learning feasibility determination process, the learning feasibility determination unit 186 determines that the learning is not feasible even when the "state other than the movement exercise state" is set as the user state.

Conversely, when the reliability of the GPS satellite signal does not satisfy the low reliability condition or the set user state is not the "state other than the movement exercise state", the learning feasibility determination unit 186 determines that the learning is feasible.

The fact that the learning is unfeasible means that learning data 26 performed in the learning process at the rear stage is not updated either. Accordingly, according to the above-described learning feasibility determination process, when the reliability of the GPS satellite signal satisfies the low reliability condition or the user is not in the movement exercise state, the update of the learning data 26 is suppressed and the learning data 26 can be prevented from being used to update the learning and updating of the movement speed relation expression using the learning data 26. Accordingly, it is possible to reduce a situation in which the calculation precision of the estimation movement speed deteriorates.

When it is determined that the learning is feasible as the result of the learning feasibility determination process of step S11 (Yes in step S13), the learning processing unit 187 performs the learning process (step S15) and the series of procedures ends. When it is determined that the learning is unfeasible (No in step S13), the series of processes of the processing procedure to which the main component analysis process is applied ends without performing the learning process of step S15.

In the learning process, the learning processing unit 187 first adds and updates the GPS movement speed and the variation cycle (at least one of the first variation cycle and the second variation cycle) and the variation strength (at least one of the first variation strength and the second variation strength) to the learning data 26 for walking. Here, when the user state is determined to be "running" through the above-described state determination process, the variation cycle and the variation strength are added to the learning data for running to be updated. Through the process herein, in the learning data 26, the variation cycle and the variation strength acquired when the user state is "walking" or "running" are associated with the GPS movement speed, so that the learning data for running and the learning data for walking are separately distinguished from each other and accumulated, as described above.

Subsequently, the learning processing unit 187 derives the movement speed relation expression with a stochastic variable wj by learning by applying a known least squares method using the learning data 26. In the learning data 26, a data set in which the GPS movement speed, the variation cycle, and the variation strength are associated with each other is accumulated at any time. For example, at a timing at which a tenth data set is added to the learning data 26, the learning processing unit 187 performs the least squares method using ten data sets including the added data set to newly determine the stochastic variable wj. Accordingly, it is possible to realize derivation of the movement speed relation expression for walking in which the current data set is reflected. In the derivation of the movement speed relation expression, a sequential statistical scheme other than the above-described least squares method can be used.

Thereafter, the learning processing unit 187 sets the movement speed relation expression derived using the learning data 26 in accordance with the least squares method and sets the newly determined stochastic variable wj to update movement speed relation expression data 273.

Referring back to FIG. 4A, the description of the acquisition processing procedure of the positional information will be continued.

When it is determined that the user is moving while changing the traveling direction by a predetermined amount or more in the behavior state of the user in step S106, that is, the user is moving in a different direction from the previous direction (curve movement) (Yes in step S106), the processing unit 18 confirms the current position (present position) based on a signal from the GPS module 11 (step S108).

When it is determined that the user is moving by a predetermined distance or for a predetermined time without changing the traveling direction by the predetermined amount or more in the behavior state of the user, that is, the user is performing a linear exercise (linear movement) to move in the same direction (No in step S106), the processing unit 18 stops the GPS module 11 (step S110) and confirms the current position (the present position) from the previous position and a position of a difference in the movement speed of the acceleration sensor 121 (step S112).

As described above, when the user is moving in a different direction from the previous direction (curve movement), it is difficult to obtain the present position of the user through estimation using a signal detected by the sensor such as the acceleration sensor 121 and it is necessary to confirm the current position (the present position) based on the signal from the GPS module 11. Conversely, when the user is moving in the same direction (linear movement), the GPS module 11 is stopped and the current position (the present position) can be confirmed from the previous position and the position of the difference in the movement speed of the acceleration sensor 121 without using the signal from the GPS module 11.

When the GPS module 11 is stopped in step S110, at least one of the RF reception circuit unit 112, the baseband circuit unit 114, and the arithmetic unit 115 is preferably stopped. By stopping the GPS module 11 in this way, it is possible to reduce power consumption while suppressing a loss in the case of re-activation. A clock signal (not illustrated) supplied to the GPS module 11 is preferably not stopped. By normally supplying the clock signal, it is possible to perform quick re-activation. Here, a clock supply source that supplies the clock signal is preferably, for example, a highly precise clock such as a temperature compensated quartz crystal oscillator (TCXO).

As will be described below, when it is determined that the user is moving in the different direction from the previous direction (curve movement) in a state in which the GPS module 11 is stopped (Yes in step S118), the GPS module 11 is activated and the current position (the present position) is confirmed based on a signal from the GPS module 11.

In this way, in accordance with the behavior state of the user determined based on the signals from the GPS module 11 and the sensor unit 12, the three units, the GPS module 11, the acceleration sensor 121, and the geomagnetic sensor 122, can be controlled to obtain the positional information of the user. In the state of the linear movement, by stopping the GPS module 11 of which power consumption is large and obtaining the positional information of the user using the acceleration sensor 121 and the geomagnetic sensor 122 of which power consumption is relatively low, it is possible to reduce power consumption necessary for position measurement. Thus, it is possible to lengthen a battery lifetime of the running watch 100. In other words, it is possible to use the running watch 100 for a long time.

Here, in the determination of the behavior state of the user in step S104, the determination is performed using the geomagnetic sensor 122 included in the sensor unit 12. A determination procedure will be described with reference to FIGS. 7, 8, 9A, and 9B. In the following description, estimation of a movement direction along a movement trajectory illustrated in FIG. 8 will be exemplified.

The processing unit 18 first acquires a direction (e, n) from the geomagnetic sensor 122, as illustrated in FIG. 7 (step S130). Here, the direction (e, n) acquired by the geomagnetic sensor 122 indicates an axis in a movement direction and data of the geomagnetic sensor 122 is estimated based on a main component analysis result as in the above-described acceleration distribution analysis process (the main component analysis process). As the movement directions estimated herein, for example, two directions indicating reverse directions are estimated as in directions D1 and D3 of the movement directions illustrated in FIGS. 8 and 9A, and a current movement direction is selected from the two directions (two-selection).

Subsequently, the processing unit 18 acquires the previous movement direction (a movement speed or a movement direction measured by the GPS module 11 are used) (step S132), and takes an inner product of data related to the previously acquired movement direction and determines whether the result of the inner product is positive or negative (step S134). Then, through the determination of step S134, the processing unit 18 estimates a direction in which the result of the inner product is a positive side (an angle formed by vectors is in the range of −90 degrees to +90 degrees) as a current movement direction (step S136) and estimates a direction in which the result of the inner product is a negative side as a reverse direction to the current movement direction (step S138). Through the estimation, as illustrated in FIG. 9B, four directions (movement directions), the direction D1, a direction D2, the direction D3 which is a reverse direction to the direction D1, and a direction D4 which is a reverse direction to the direction D2, can be specified. Then, based on the estimated movement direction, the processing unit 18 can determine whether the behavior state of the user is the state in which the user is moving in the different direction from the previous direction (curve movement) or the user is performing a linear exercise (linear movement) in the same direction.

Further, a method of stopping the GPS module 11 and calculating a position of a difference to confirm a current position (a present position) from a previous position and the position of the difference in a movement speed of the acceleration sensor 121 without using a signal from the GPS module 11 will be described below with reference to FIG. 10.

As illustrated in FIG. 10, the processing unit 18 first acquires a speed [s] from the acceleration sensor 121 (step S150). The acceleration sensor 121 can acquire the speed [s] from a vertical movement and an intensity or a strength of an arm swing of the user. At this time, the speed [s] is assumed to be a movement distance in which a sampling rate at which a current position is calculated is set as a time unit. For example, when it is assumed that a current position is calculated once per second, a unit of the speed [s] is [m/sec].

Subsequently, the processing unit 18 acquires a current movement direction (e, n) which is a horizontal movement direction from the geomagnetic sensor 122 in accordance with the above-described method (step S152). The movement direction acquired at this time is expressed as (e, n), but the norm is established without loss of generality for "1".

Subsequently, the processing unit 18 acquires the previous position (e_last, n_last) from the storage unit 20 (the positional information data 28) (step S154). Then, the processing unit 18 obtains a relative movement amount (position) by multiplying the acquired movement direction (e, n) by the speed [s]. Then, the processing unit 18 calculates the current position by adding the previous position (e_last, n_last) to the relative position (step S156). As described above, the series of procedure of the method of calculating the position of the difference, which is a calculation method of confirming the current position (the present position) from the previous position and the position of the difference in the movement speed of the acceleration sensor 121 without using a signal from the GPS module 11, ends.

The scheme in which the atmospheric pressure sensor 123 is used can be applied to the calculation method described with reference to FIG. 10. The scheme in which the atmospheric pressure sensor 123 is used will be described below with reference to FIG. 11. By using the atmospheric pressure sensor 123, it is possible to obtain the position of the difference in a height direction (a difference in elevation) in addition to calculation of the position in the horizontal direction described with reference to FIG. 10.

As illustrated in FIG. 11, the processing unit 18 first acquires a speed [s] from the acceleration sensor 121 (step S160). The acceleration sensor 121 can acquire the speed [s] from a vertical movement and an intensity or a strength of an arm swing of the user. At this time, the speed [s] is assumed to be a movement distance in which a sampling rate at which a current position is calculated is set as a time unit. For example, when it is assumed that a current position is calculated once per second, a unit of the speed [s] is [m/sec].

Subsequently, the processing unit 18 acquires a current movement direction (e, n) which is a horizontal movement direction from the geomagnetic sensor 122 in accordance with the above-described method (step S162). The movement direction acquired at this time is expressed as (e, n), but the norm is established without loss of generality for "1".

Subsequently, the processing unit 18 acquires a difference (Δu) in an altitude as a difference between a previous altitude and a current altitude from the atmospheric pressure sensor 123 (step S164).

Subsequently, the processing unit 18 acquires the previous position (e_last, n_last, u_last) from the storage unit 20 (the positional information data 28) (step S166). Then, the processing unit 18 obtains a relative movement amount (position) by multiplying the acquired movement direction (e, n, u) by the speed [s]. Then, the processing unit 18 calculates the current position also including a difference of elevation by adding the previous position (e_last, n_last, u_last) to the relative position (step S168). As described above, the series of procedure of the method of calculating the position of the difference to confirm the current position (the present position) in 3-dimensionally from the previous position, the position of the difference in the movement speed of the acceleration sensor 121, and the position of the difference of elevation of the atmospheric pressure sensor 123 without using a signal from the GPS module 11 ends.

Referring back to FIG. 4A, the description of the acquisition processing procedure of the positional information will be continued.

The processing unit 18 notifies the positional information processing unit 188 (the application side) with a form including a flag or the like of a position acquisition elapse information of whether the confirmed current position (the present position of the user) is a result obtained using the GPS module 11 in step S108 or a result obtained using (adding) the positional information of the difference using the acceleration sensor 121 in step S112 (step S114). In addition, the processing unit 18 can also notify the positional information processing unit 188 (the application side) of the confirmed current position (the present position of the user). The application side of the portable terminal device 600 such as a smartphone or a tablet terminal device can be notified of the current position.

The positional information processing unit 188 (the application side) generates positional information using the confirmed current position (the present position of the user) and the notified position acquisition elapse information and converts the positional information into display data such as a plot of a map on the display unit 14 or displays the positional information on the display unit 14. Then, the processing unit 18 substitutes the confirmed current position to the previous position and makes preparation for a subsequent process (step S116).

Subsequently, as in the above-described step S106, the processing unit 18 determines whether the user is moving while changing the traveling direction by the predetermined amount or more in the behavior state of the user (step S118). When the processing unit 18 determines that the user is moving in the different direction from the previous direction (curve movement) in the determination (Yes in step S118), the processing unit 18 activates the GPS module 11 (step S120). In this way, by activating the GPS module 11 to acquire the detailed positional information in accordance with the change in the behavior state of the user, it is possible to shorten an operation time of the GPS module 11 of which power consumption is large and acquire positional information. Therefore, it is possible to reduce power consumption.

Here, the processing unit 18 determines whether an operation of ending the procedure related to the confirmation of the position is performed (step S122). When the operation of ending the procedure is not performed (No in step S122), the process returns to the above-described step S108, the current position (the present position) is confirmed based on a signal from the GPS module 11, and the subsequent procedure is repeated. When it is determined in step S118 that a linear exercise (the linear movement) in which the user is moving in the same direction is performed (No in step S118), the process proceeds to a subsequent step. The processing unit 18 determines whether an operation of ending the procedure related to the confirmation of the position is performed (step S124). When the operation of ending the procedure is not performed (No in step S124), the process returns to the above-described step S112. In the state in which the GPS module 11 is stopped, the current position (the present position) is confirmed from the previous position and the position of the difference of the movement speed of the acceleration sensor 121 and the subsequent procedure is repeated.

When the operation of ending the procedure for confirming the position is performed (Yes in step S122 or Yes in step S124), the processing unit 18 ends the series of procedure related to the acquisition processing procedure of the positional information.

According to the method of controlling the running watch 100 using the acquisition processing procedure of the positional information described above, the positional information of the user can be obtained by controlling at least two (in the embodiment, the GPS module 11, the acceleration sensor 121, and the geomagnetic sensor 122) of the GPS module 11, the acceleration sensor 121, the geomagnetic sensor 122, and the atmospheric pressure sensor 123 in accordance with the behavior state of the user determined based on a signal from one of the GPS module 11, and the acceleration sensor 121, the geomagnetic sensor 122, and the atmospheric pressure sensor 123 included in the sensor unit 12. In this way, by controlling the GPS module 11 or various sensors to be operated using the acceleration sensor 121, the geomagnetic sensor 122, and the atmospheric pressure sensor 123 of which power consumption is relatively low and in accordance with the behavior state of the user, it is possible to reduce power consumption necessary for such an operation and lengthen a battery lifetime. Accordingly, it is possible to use the running watch 100 which is a wearable device for a long time.

Incidentally, when power consumption of the GPS module 11 is assumed to be "1", power consumption of the acceleration sensor 121 is about "0.005", power consumption of the geomagnetic sensor 122 is about "0.01", and power consumption of the atmospheric pressure sensor 123 is about "0.01". In this way, the power consumption of the GPS module 11 is 100 times or more the power consumption of the sensors.

In the above-described processing procedure, the application example illustrated in FIG. 4B can be applied. Hereinafter, the application example will be described. In the application example illustrated in FIG. 4B, there is a difference in a procedure continuing from step S118 included in the above-described processing procedure and step S120 of activating the GPS module 11 according to the determination result of step S118.

In step S120, the processing unit 18 activating the GPS module 11 selects activation of a learning function or stopping of the acceleration sensor 121 (step S121). More specifically, the processing unit 18 selects activation of the learning function of speed information detected by the acceleration sensor or a process of confirming the current position (the present position) based on a signal from the activated GPS module 11 according to a state in which the acceleration sensor 121 is operated. The learning function is activated in step S121 during an operation of the GPS module 11 and during an operation of the sensor unit 12.

The "learning or learning function" herein means, for example, update of a relation expression in which a movement speed estimated by the acceleration sensor 121 is associated with a movement speed by the GPS module 11 with high precision or accumulation of data so that precision of a movement speed estimated by the acceleration sensor 121 is improved using the associated movement speed or the like.

In the learning, correlation between a positioning result of the GPS module 11 and an output of the sensor unit 12 is learned to accumulate data. In this way, by learning the correlation between the positioning result of the GPS module 11 during the operation of the GPS module 11 and during the operation of the sensor unit 12 and the output of the sensor unit 12, it is possible to improve estimation precision of the positional information by the sensor unit 12.

When the activation of the learning function is selected in step S121, for example, the processing unit 18 compares speed data acquired by the acceleration sensor 121 with speed data acquired by the GPS module 11, performs the learning process such as learning update of the movement speed relation expression (step S123), and ends the series of processing procedure.

When the stopping of the acceleration sensor 121 is selected in step S121, the processing unit 18 stops the operation of the acceleration sensor 121 (step S125), confirms the current position (the present position) based on a signal from the activated GPS module 11 (step S127), and ends the series of processing procedure.

According to the procedure, it is determined whether it is necessary to learn the positional information of the GPS module 11 and the detected data of the acceleration sensor 121 and whether to stop the acceleration sensor 121 is selected. Therefore, since an unnecessary operation of the acceleration sensor 121 is excluded, it is possible to further reduce power consumption.

The relation between the GPS module 11 and the acceleration sensor 121 has been described as an example in the processing procedure related to the application example illustrated in FIG. 4B. Here, a procedure in which the acceleration sensor 121 is replaced with the geomagnetic sensor 122 can be set. In the procedure, it is determined whether it is necessary to learn the positional information of the GPS module 11 and the detected data of the geomagnetic sensor 122 and whether to stop the geomagnetic sensor 122 is selected. Therefore, since an unnecessary operation of the geomagnetic sensor 122 is excluded, it is possible to further reduce power consumption. The acceleration sensor 121 can be replaced with the atmospheric pressure sensor 123, and thus it is possible to obtain the same advantages as those of the acceleration sensor 121.

In the processing procedures illustrated in FIGS. 4A and 4B, an operation time of one of the acceleration sensor 121, the geomagnetic sensor 122, and the atmospheric pressure sensor 123 included in the sensor unit 12 is preferably set to be longer than an operation time of the GPS module 11 by setting a span from the start illustrated in FIG. 4A to the end of the series of procedure as a unit. In this way, it is possible to shorten an operation time of the GPS module 11 of which power consumption is relatively large and it is possible to achieve low power consumption.

A stop timing of the GPS module 11 is preferably subsequent to an activation timing of one of the acceleration sensor 121, the geomagnetic sensor 122, and the atmospheric pressure sensor 123 included in the sensor unit 12.

An activation timing of the GPS module 11 is preferably subsequent to the stop timing of one of the acceleration sensor 121, the geomagnetic sensor 122, and the atmospheric pressure sensor 123 included in the sensor unit 12.

In this way, by setting the activation or stop timing of the GPS module 11 and the sensor unit 12, it is possible to frequently obtain a time in which an operation of the GPS module 11 overlaps an operation of one of the acceleration sensor 121, the geomagnetic sensor 122, and the atmospheric pressure sensor 123 included in the sensor unit 12 and frequently perform the learning.

1.3.1. Power Control Method for Wearable Device (Running Watch)

Figure 12:
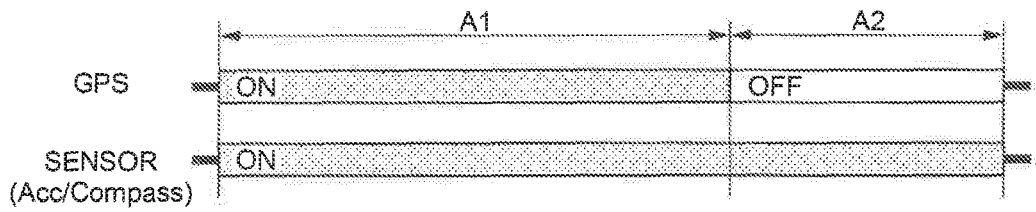
FIG. 12 is a timing chart illustrating example 1 of a power control method for GPS and a sensor during a learning period.
Figure 13:
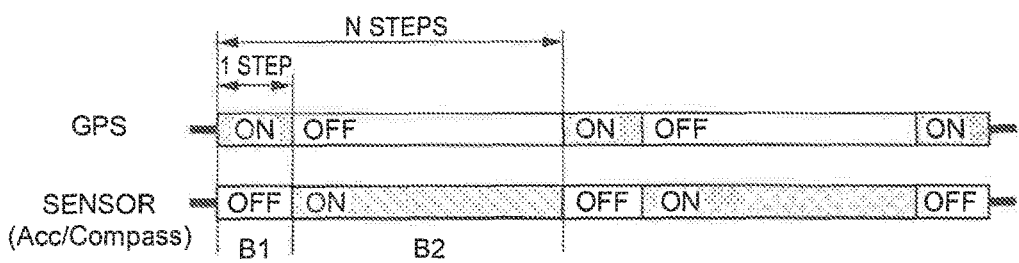
FIG. 13 is a timing chart illustrating example 2 of the power control method for GPS and the sensor during the learning period.
Figure 14:
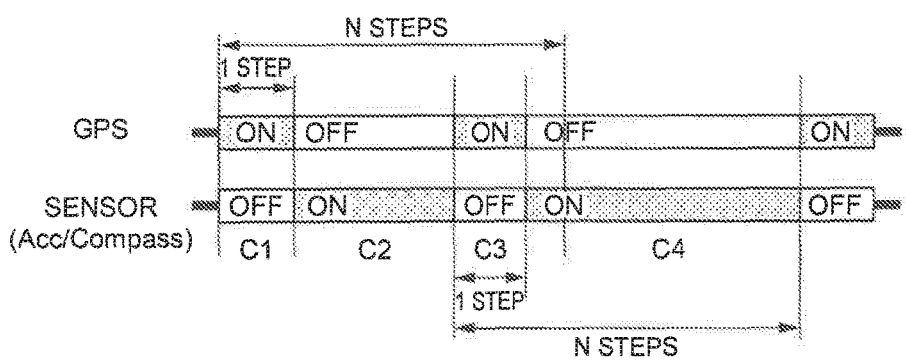
FIG. 14 is a timing chart illustrating example 3 of the power control method for GPS and the sensor during the learning period.
Figure 15:
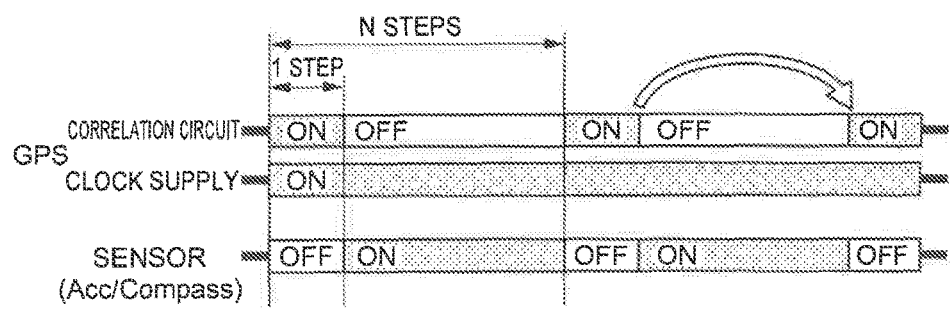
FIG. 15 is a timing chart illustrating example 4 of the power control method for GPS and the sensor during the learning period.
Figure 16:
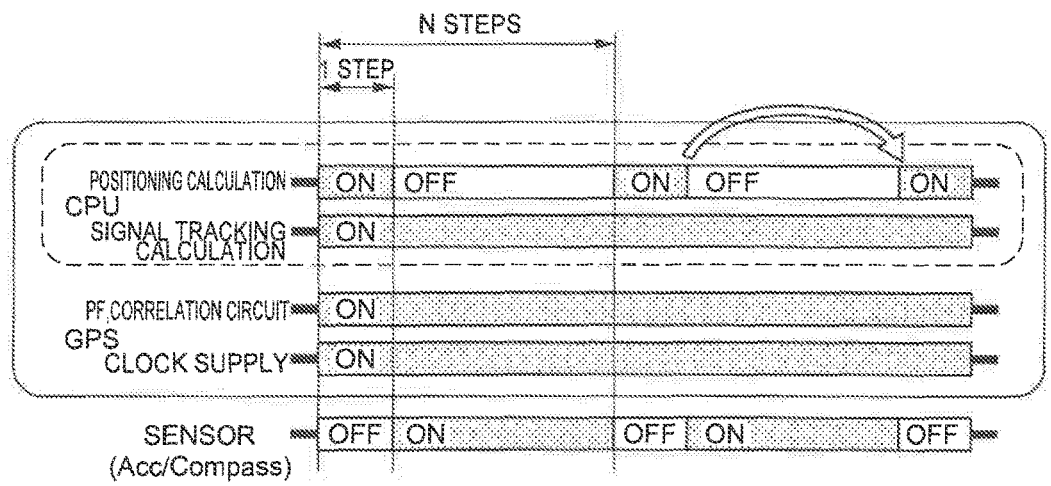
FIG. 16 is a timing chart illustrating example 5 of the power control method for GPS and the sensor during the learning period.

To reduce power consumption related to an operation of the running watch 100 which is a wearable device, it is important to control power of the GPS module 11 serving as a position detection unit when the above-described "learning" is performed. Hereinafter, Examples 1 to 5 will be described as instances of the power control method for the GPS module 11 to reduce power consumption with reference to FIGS. 12 to 16. FIGS. 12 to 16 are timing charts illustrating the examples of a power control method for GPS and a sensor during a learning period. FIG. 12 illustrates Example 1 of the power control method, FIG. 13 illustrates Example 2 of the power control method, FIG. 14 illustrates Example 3 of the power control method, FIG. 15 illustrates Example 4 of the power control method, and FIG. 16 illustrates Example 5 of the power control method. In the following description, the same reference numerals are given to the same constituents as the above-described constituents.

Example 1 of Power Control Method

Example 1 of the power control method for the GPS module 11 and the sensor unit 12 during a learning period illustrated in FIG. 12 is a sample control method in the examples. In FIG. 12, the horizontal axis represents an elapsed time, an elapsed time which is a previous time is set as a time period A1, and an elapsed time which is a subsequent time continuing from the time period A1 is set as a time period A2. In the control method of Example 1, the GPS module 11 (GPS in the drawing) and the sensor unit 12 (SENSOR in the drawing) are turned ON (activated) in the time period A1 which is the previous time. During the activation, positional information such as a present position or a speed can be acquired based on a signal from the GPS module 11. A time interval between the time periods A1 and A2 is set in advance.

In the time period A2 which is a subsequent time of the time period A1, an operation of the sensor unit 12 continues and the GPS module 11 is turned OFF (stopped). In this case, since the GPS module 11 is turned OFF (stopped), positional information in accordance with a signal from the GPS module 11 may not be acquired. However, a signal from the sensor unit 12 which is normally turned ON (activated) can be continuously acquired to update information such as an azimuth or a speed.

During the time period A1, both the GPS module 11 and the sensor unit 12 are operating. Therefore, learning can be performed, for example, to update the movement speed relation expression using a direction of a movement speed acquired based on a signal from the GPS module 11 and azimuth information acquired by the sensor unit 12 (the geomagnetic sensor 122). During the time period A2, information such as an azimuth or a speed can be acquired from azimuth information calculated based on the signal from the sensor unit 12 (the geomagnetic sensor 122) or speed information calculated based on the signal from the sensor unit 12 (the acceleration sensor 121) without using the signal from the GPS module 11 by applying the updated movement speed relation expression.

As in Example 1 of the power control method described above, a stop timing of the GPS module 11, that is, a timing at which a time period is changed from the time period A1 to the time period A2 is preferably subsequent to the activation timing of the sensor unit 12. In other words, an activation timing of the GPS module 11 is preferably previous than a stop timing of the sensor unit 12. In this way, it is possible to frequency obtain a time in which an operation of the GPS module 11 overlaps an operation of the geomagnetic sensor 122 or the acceleration sensor 121 included in the sensor unit 12, and thus it is possible to frequently perform the learning.

According to the method of Example 1, the time period A2 in which the GPS module 11 of which power consumption is relatively large is stopped can be set and the information such as an azimuth or a speed based on the signal from the sensor unit 12 can be acquired with reference to a result learned during the operation of the GPS module 11. Therefore, it is possible to reduce power consumption necessary for the acquisition and it is possible to lengthen a battery lifetime.

Example 2 of Power Control Method

Example 2 of the power control method for the GPS module 11 and the sensor unit 12 during a learning period illustrated in FIG. 13 has a time period B1 which is an elapsed time equivalent to one step of the user and a time period B2 which is a subsequent time of the time period B1 and is a set elapsed time.

In the time period B1 which is a previous time, only the GPS module 11 is turned ON (activated) and the sensor unit 12 is turned OFF (stopped). Accordingly, in the time period B1, positional information such as a direction of a movement speed is acquired from a signal from the GPS module 11. In the time period B2 which is a subsequent time, the sensor unit 12 (the geomagnetic sensor 122 or the acceleration sensor 121) are activated, the GPS module 11 is turned OFF (stopped), and azimuth information by the sensor unit 12 is acquired. During the time period B2, information indicating an azimuth or a speed repeated at a predetermined period (for example, each step) is acquired. When the set time period B2 ends, the time returns to the time period B1, the GPS module 11 is turned ON (activated), and the sensor unit 12 is turned OFF (stopped).

Thereafter, this cycle is repeated. In the power control method of Example 2, the GPS module 11 and the sensor unit 12 are turned ON (activated) alternately between the time period B1 and the time period B2. At one cycle in which the time periods B1 and B2 are combined, an operation time (the time period B2) in which the sensor unit 12 is turned ON (activated) is preferably set to be longer than an operation time (time period B1) in which the GPS module 11 is turned ON (activated). Thus, by setting the operation time of the GPS module 11 of which power consumption is relatively large to be shorter than the operation time of the sensor unit 12, it is possible to achieve low power consumption. As described in Example 1, the stop timing of the GPS module 11, that is, the timing at which a time period is changed from the time period A1 to the time period A2 is preferably subsequent to the activation timing of the sensor unit 12. In other words, the activation timing of the GPS module 11 is preferably previous than the stop timing of the sensor unit 12.

According to the method of Example 2, by turning ON (activating) the GPS module 11 and the sensor unit 12 alternately between the time period B1 and the time period B2, it is possible to reduce power consumption for information acquisition and it is possible to lengthen a battery lifetime.

Example 3 of Power Control Method

Example 3 of the power control method for the GPS module 11 and the sensor unit 12 during a learning period illustrated in FIG. 14 has time period C1 which is an elapsed time equivalent to one step of the user and a time period C2 which is a subsequent time of the time period C1 and is a set elapsed time as in Example 2. Example 3 is an example in which a switch timing from the time period B2 to the time period B1 of Example 2 is different.

In the time period C1 which is a previous time, only the GPS module 11 is turned ON (activated) and the sensor unit 12 is turned OFF (stopped). Accordingly, in the time period C1, positional information such as a direction of a movement speed is acquired based on a signal from the GPS module 11. In the time period C2 which is a subsequent time, the sensor unit 12 (the geomagnetic sensor 122 or the acceleration sensor 121) are activated, the GPS module 11 is turned OFF (stopped), and azimuth information by the sensor unit 12 is acquired. During the time period C2, information indicating an azimuth or a speed repeated at a predetermined period (for example, each step) is acquired.

Then, a difference from information indicating an azimuth acquired first in the time period C2 is monitored at a regulated period. When it is determined that there is a change in an azimuth greater than a predetermined value, a time period transitions to a time period C3 (which is the same as the time period C1) in which the GPS module 11 is turned ON (activated) and the sensor unit 12 is turned OFF (stopped). That is, when the user performs a curve movement (a behavior involving a direction change), the time period transitions from the time period C2 to the time period C3. The time period C3 has an elapsed time equivalent to one step of the user as in the time period C1. The GPS module 11 is turned ON (activated), the sensor unit 12 is turned OFF (stopped), and positional information such as a direction of a movement speed is acquired from a signal from the GPS module 11. Then, in the time period C3, the time period transitions to a time period C4 when the elapsed time equivalent to one step of the user comes.

The time period C4 which is a subsequent time of the time period C3 has a set elapsed time. The sensor unit 12 is turned ON (activated), the GPS module 11 is turned OFF (stopped), and azimuth information by the sensor unit 12 is acquired as in the time period C2. Even in the time period C4, a difference from information indicating an azimuth acquired first in the time period C4 is monitored at a regulated period. When it is determined that there is a change in an azimuth greater than a predetermined value, a time period transitions to a subsequent time period simultaneously with the time period C3. Then, when there is no change in the azimuth greater than the predetermined value in the elapsed time of the time period C4, the time period returns to the time period C1 and this cycle is subsequently repeated. As described in Example 1, the stop timing of the GPS module 11, that is, the timing at which a time period is changed from the time period A1 to the time period A2 is preferably subsequent to the activation timing of the sensor unit 12. In other words, the activation timing of the GPS module 11 is preferably previous to the stop timing of the sensor unit 12.

According to the method of Example 3, when it is determined that there is the change in the azimuth greater than the predetermined value, that is, when the user performs a curve movement, the time period transitions to the time period C3 (which is the same as the time period A1) in which the GPS module 11 is turned ON (activated) and the sensor unit 12 is turned OFF (stopped) and the positional information such as the direction of the movement speed can be acquired based on a signal from the GPS module 11. By turning ON (activating) the GPS module 11 and the sensor unit 12 alternately between the time period C1 and the time period C2, it is possible to reduce power consumption for information acquisition and it is possible to lengthen a battery lifetime.

Example 4 of Power Control Method

In Example 4 of the power control method for the GPS module 11 and the sensor unit 12 during a learning period illustrated in FIG. 15, switching control of the GPS module 11 and the sensor unit 12 is performed as in the time period B1 and the time period B2 which is the subsequent time in Example 2 described above.

Specifically, in Example 4 of the power control method, when the GPS module 11 is turned OFF (stopped), at least one of the RF reception circuit unit 112, the baseband circuit unit 114, and the arithmetic unit 115 is stopped while supplying a clock signal at any time. By supplying the clock signal at any time in this way, it is possible to supplement a signal simply again. As a result, it is possible to perform quick re-reactivation of the GPS module 11 and control of OFF (stop) in a short time. The GPS module 11 may have both a highly precise clock and a clock of low power consumption such as the above-described TCXO serving as a clock supply source. In this case, even when the TCXO is turned OFF to enter a further low power consumption state, clocking can be performed with a clock source of which power consumption is low. Therefore, the TCXO can be re-activated quickly more than when the clock of the GPS module 11 is completely turned OFF. For example, a real-time clock of 32 kHz can be exemplified as the clock source of which power consumption is low.

Example 5 of Power Control Method

In Example 5 of the power control method for the GPS module 11 and the sensor unit 12 during the learning period illustrated in FIG. 16, switching control of the GPS module 11 and the sensor unit 12 is performed in accordance with the time period of the previous time and the time period of the subsequent time as in Example 4 described above. At this time, a switching portion in the GPS module 11 is different from that in Example 4.

Specifically, in Example 5 of the power control method, when the GPS module 11 is turned OFF (stopped), positioning calculation is stopped in a state in which a clock signal and a correlation circuit of the RF reception circuit unit 112 and the baseband circuit unit 114 or the arithmetic unit 115 are turned ON (activated). Since signal tracking is not interrupted by stopping only the positioning calculation in this way, stable positioning can be performed. Alternatively, since countermeasures of carrier wave positioning can also be taken, it is possible to suppress deterioration in precision at the time of power OFF.

1.4 Application Example of Method of Controlling Wearable Device (Running Watch)

Figure 17:
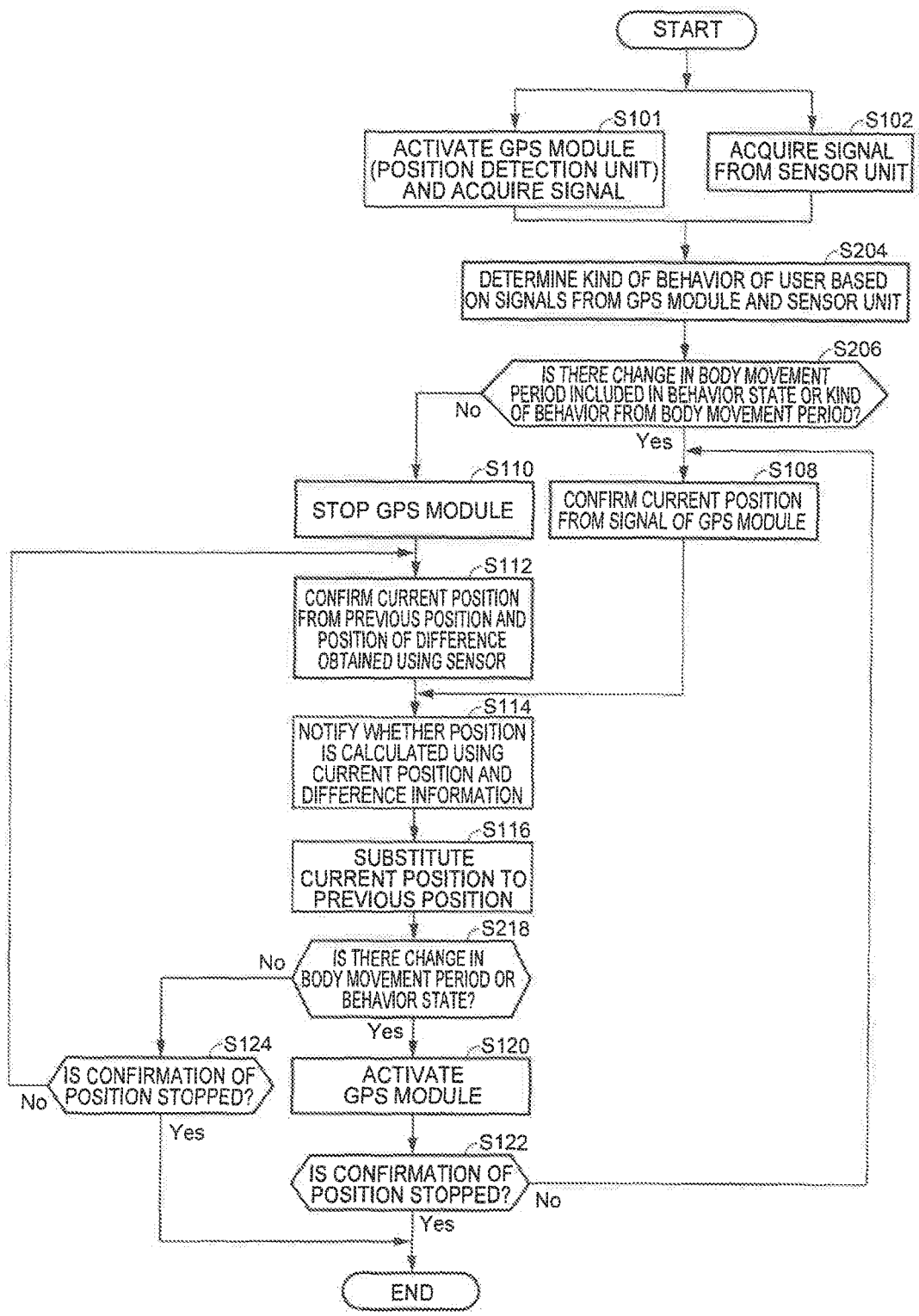
FIG. 17 is a flowchart illustrating an application example of an acquisition procedure of positional information related to the running watch.

Next, an application example of the method of controlling the running watch 100 which is a wearable device will be described with reference to FIG. 17. FIG. 17 is a flowchart illustrating an application example of an acquisition procedure of positional information related to the running watch. In the description of the procedure according to the following application example, the same reference numerals as the reference numerals used to describe the configurations of the exercise support system 1000 and the running watch 100 described above are applied for the description. A method of controlling the running watch 100 according to the application example to be described below is different from the method of controlling the running watch, as described above with reference to FIG. 4A, in a procedure equivalent to steps S104 and S106 of the control method. Accordingly, in the following description, different steps from the steps of the method of controlling the running watch, as described above with reference to FIG. 4A, will be mainly described. The description of the same steps will be omitted by applying the same step names.

The method of controlling the running watch 100 according to the invention includes: determining a kind of behavior of the user based on the body movement period included in the behavior state of the user determined based on the signals from the GPS module 11 serving as the position detection unit and the sensor unit 12 including at least one of the acceleration sensor 121, the geomagnetic sensor 122, and the atmospheric pressure sensor 123; controlling at least two of the GPS module 11, the acceleration sensor 121, the geomagnetic sensor 122, and the atmospheric pressure sensor 123 in accordance with the kind of behavior; and acquiring positional information. The processing procedure described herein can be realized when the processing unit 18 reads the position estimation program 21 from the storage unit 20 and executes the position estimation program 21. The running watch 100 confirms or estimates the position of the user by performing the process in accordance with the processing procedure of FIG. 17. The body movement period in the control method can be rephrased as a period of a movement of the body related to walking, running, or the like of the user and can be expressed by, for example, a walking time per step (600 ms/step) or the number of steps per minute (100 steps/minute).

Hereinafter, the method of controlling the running watch 100 with regard to the application example of the running watch 100 will be described with reference to FIG. 17. Here, the acquisition processing procedure of the positional information illustrated in FIG. 17 starts, for example, when a measurement start operation is performed by the user through the operation unit 13. Until a measurement end operation is performed, the processes of steps S101 to S124 are performed repeatedly at a predetermined period, for example, at an interval of 1 second. When the measurement start operation is performed, measurement of a present position or the like by the GPS module 11, detection of acceleration detected by the acceleration sensor 121, detection of a movement direction by the geomagnetic sensor 122, and the like start and are performed in parallel until the acquisition processing procedure of the positional information ends. In the processing procedure, the description of a process related to the atmospheric pressure sensor 123 is omitted. The processing procedure can be used similarly to the above-described procedure.

A detection result signal is output from the acceleration sensor 121 or the geomagnetic sensor 122 at any time. The processing unit 18 samples and takes the detection result signal as detected acceleration data or detection azimuth data at a predetermined sampling rate, and the data is used for a position estimation process and control of the GPS module 11. The sampling rate can be, for example, 32 samples per second. Of course, another sampling rate may be used.

The user wearing the running watch 100 on his or her wrist performs a measurement start operation through the operation unit 13 to start a series of processing procedure as in the above-described procedure. The GPS module 11 is activated and a satellite signal is acquired in step S101, and a signal related to the acceleration data by the acceleration sensor 121 and a signal related to the movement direction data by the geomagnetic sensor 122 are acquired in step S102.

Subsequently, the processing unit 18 determines a kind of behavior of the user from the body movement period included in the behavior state of the user based on signals from the GPS module 11, the acceleration sensor 121, and the geomagnetic sensor 122 (step S204). Here, the kind of behavior of the user indicates, for example, a running state or a walking state. When a general person is running, a period of arm swing which is a body movement period is known to be about 600 to 700 (msec). When the general person is walking, a period of an arm swing is known to be about 1000 to 1300 (msec). That is, when the general person is running, the number of pitches of the arm swing per unit time is greater when the general person is walking. In this way, a behavior state can be determined in accordance with a body movement period of an arm swing or the like.

Subsequently, the processing unit 18 determines whether there is a change in the body movement period or the determined kind of behavior (step S206). Here, the change is, for example, a change in a period of arm swing from a value of a running state to a value of a walking state or means that a kind of behavior determined to be a running state is determined to be a walking state.

The processing unit 18 determines whether there is a change in the behavior period or the kind of behavior of the user (step S206). When the processing unit 18 determines that there is the change in the behavior period exceeding a predetermined threshold or determines that there is the change in the kind of behavior of the user (Yes in step S206), the processing unit 18 confirms the current position (the present position) based on a signal from the GPS module 11 (step S108).

When the processing unit 18 determines that there is no change in the behavior period exceeding the predetermined threshold or determines that there is no change in the kind of behavior of the user (No in step S206), the processing unit 18 stops the GPS module 11 (step S110) and confirms the current position (the present position) from the previous position and a position of a difference in the movement speed of the acceleration sensor 121 (step S112).

As described above, when there is the change in the body movement period of the user or there is the change in the kind of behavior of the user, it is difficult to obtain the present position of the user through estimation using a signal detected by the sensor such as the acceleration sensor 121 and it is necessary to confirm the current position (the present position) based on the signal from the GPS module 11. Conversely, when it is determined that there is no change in the behavior period of the user or it is determined that there is no change in the kind of behavior of the user, the GPS module 11 is stopped and the current position (the present position) can be confirmed from the previous position and the position of the difference in the movement speed of the acceleration sensor 121 without using the signal from the GPS module 11.

Thereafter, the process proceeds to steps S114 and S116. Since the two steps are the same procedure of the method of controlling the running watch 100, as described above with reference to FIG. 4A, the description thereof will be omitted.

After step S116, the processing unit 18 determines whether there is a change in the behavior period or the kind of behavior of the user similarly to the above-described step S206 (step S218). When the processing unit 18 determines that there is the change in the behavior period exceeding the predetermined threshold or determines that there is the change in the kind of behavior of the user (Yes in step S218), the processing unit 18 activates the GPS module 11 (step S120). In this way, by activating the GPS module 11 to acquire the detailed positional information in accordance with the kind of behavior or the body movement period of the user, it is possible to shorten an operation time of the GPS module 11 of which power consumption is large and it is possible to obtain the positional information. Therefore, it is possible to reduce power consumption.

Here, the processing unit 18 determines whether an operation of ending the procedure related to the confirmation of the position is performed (step S122). When the operation of ending the procedure is not performed (No in step S122), the process returns to the above-described step S108, the current position (the present position) is confirmed based on a signal from the GPS module 11, and the subsequent procedure is repeated.

When it is determined in step S218 that there is no change in the behavior period or the kind of behavior of the user (No in step S218), the process proceeds to a subsequent step. The processing unit 18 determines whether an operation of ending the procedure related to the confirmation of the position is performed (step S124). When the operation of ending the procedure is not performed (No in step S124), the process returns to the above-described step S112. In the state in which the GPS module 11 is stopped, the current position (the present position) is confirmed from the previous position and the position of the difference of the movement speed of the acceleration sensor 121 and the subsequent procedure is repeated.

When the operation of ending the procedure for confirming the position is performed (Yes in step S122 or Yes in step S124), the processing unit 18 ends the series of procedure related to the acquisition processing procedure of the positional information.

According to the method of controlling the running watch 100 according to the above-described application example, the kind of behavior of the user is determined based on the body movement period included in the behavior state. By controlling at least two of the GPS module 11, the acceleration sensor 121, and the geomagnetic sensor 122, and the atmospheric pressure sensor 123 in accordance with change in the determined kind of behavior or the body movement period, it is possible to obtain the positional information of the user. In this way, by controlling the GPS module 11 or various sensors to be operated using the acceleration sensor 121, the geomagnetic sensor 122, and the atmospheric pressure sensor 123 of which power consumption is relatively low and in accordance with the behavior state of the user, it is possible to reduce power consumption necessary for such an operation and lengthen a battery lifetime.

Accordingly, it is possible to use the running watch 100 which is a wearable device for a long time.

In the acquisition procedure of the positional information related to the above-described running watch (see FIG. 4A: step S106) and the application example of the acquisition procedure of the positional information (see FIG. 17: step S206), the control such as the activation or stopping of at least two of the GPS module 11, the acceleration sensor 121, and the geomagnetic sensor 122, and the atmospheric pressure sensor 123 is performed by determining the movement direction in the behavior state of the user in the procedure illustrated in FIG. 4A and determining the kind of behavior in the behavior state of the user in the procedure illustrated in FIG. 17, as described above. However, the invention is not limited thereto. For example, the control such as the activation or stopping of at least two of the GPS module 11, the acceleration sensor 121, and the geomagnetic sensor 122, and the atmospheric pressure sensor 123 may be performed by determining both the movement direction and the kind of behavior in the behavior state of the user. In such a configuration, since the wearable device corresponding to the behavior and the movement direction of the user can be controlled, it is possible to lengthen a continuous activation time or a continuous measurement time of the wearable device.

1.5. Method of Displaying Wearable Device (Running Watch)

Figure 18:
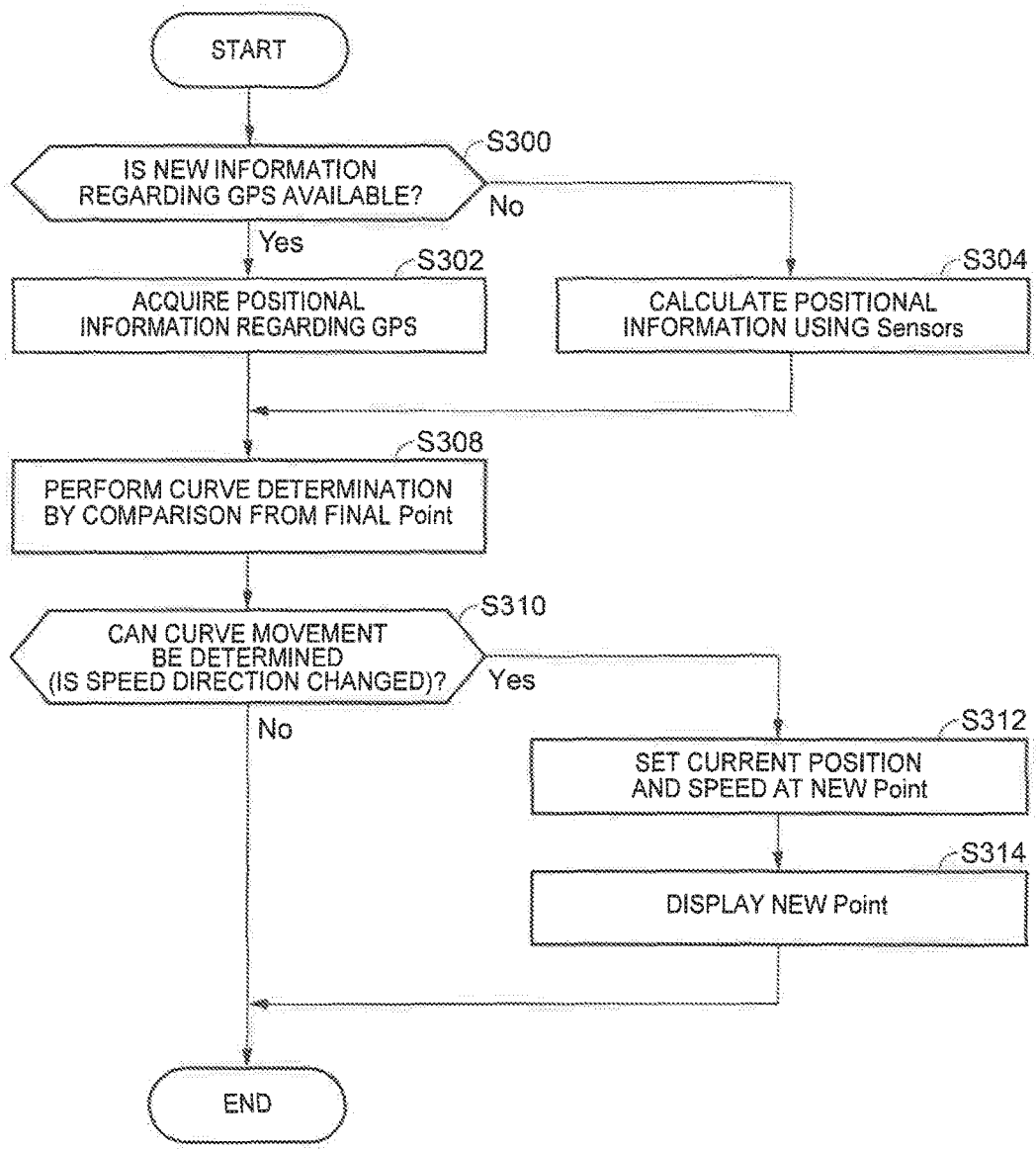
FIG. 18 is a flowchart illustrating display method 1 for trajectory of a position related to the running watch.
Figure 19:
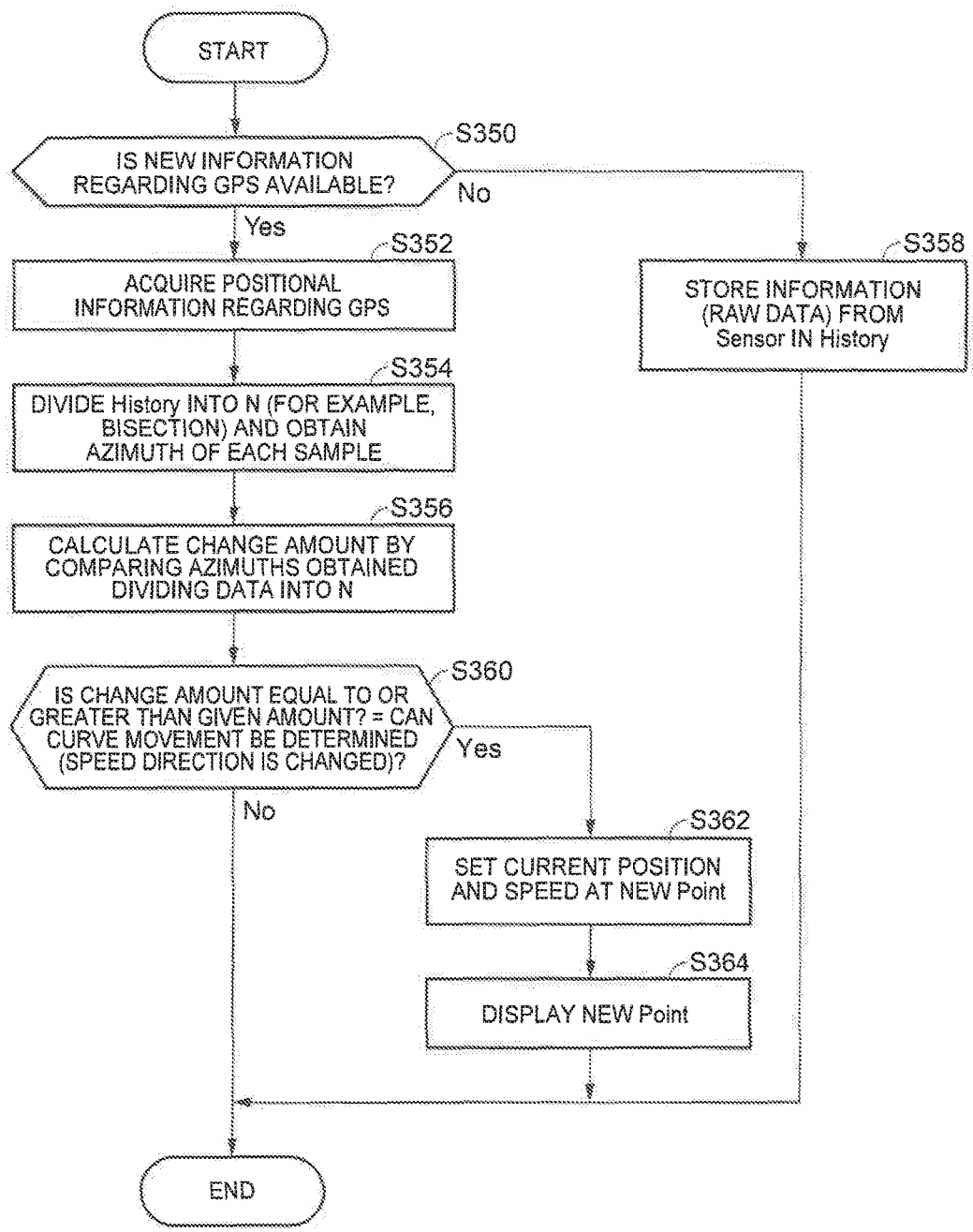
FIG. 19 is a flowchart illustrating display method 2 for trajectory of a position related to the running watch.

Next, a method of displaying the running watch 100 which is a wearable device will be described with reference to FIGS. 18 and 19. FIG. 18 is a flowchart illustrating display method 1 for trajectory of a position related to the running watch. FIG. 19 is a flowchart illustrating display method 2 for trajectory of a position related to the running watch. In the following description, the same reference numerals as the reference numerals used to describe the configurations of the exercise support system 1000 and the running watch 100 described above are applied for the description.

In the above-described method of controlling the running watch 100, the GPS module 11 is intermittently operated and further the positional information is complemented with the azimuth information, the speed information, or the like obtained using the sensors such as the acceleration sensor 121, the geomagnetic sensor 122, and the atmospheric pressure sensor 123 included in the sensor unit 12. Hereinafter, a display method related to the position in this case and a modification example of the display method will be described.

1.5.1. Display Method 1

In Display Method 1 illustrated in FIG. 18, the processing unit 18 first determines whether new information regarding GPS acquired by the GPS module 11 is available (step S300). When the processing unit 18 determines that the new information regarding GPS can be used (Yes in step S300), the processing unit 18 acquires the positional information of GPS (step S302). When the processing unit 18 determines that the new information regarding GPS is not available (No in step S300), the processing unit 18 acquires positional information calculated using various sensors (step S304).

Subsequently, the processing unit 18 determines a curve movement by comparison from a point of a final position (step S308). Then, when the processing unit 18 determines that a curve movement is performed (a speed direction is changed) (Yes in step S310), the processing unit 18 sets a current position and speed at a point of a new position (step S312). Then, the processing unit 18 displays the point of a newly set position on the display unit 14 (step S314) and ends the series of processes.

When the processing unit 18 determines that the curve movement is not performed (the speed direction is not changed) (No in step S310), the processing unit 18 ends the series of processes without changing the display of the point of the position.

According to Display Method 1, only when it is determined that the curve movement is performed (the speed direction is changed) (Yes in step S310), the point of a new position is set and a point of the newly set position is displayed. In this way, the points of the positions displayed on the display unit 14 can be decimated, for example, by setting and displaying the points of the positions in a case in which the behavior state such as the curve movement is changed without setting the points of the positions in a case in which there is no change in the behavior state such as a linear exercise. By performing the decimation, it is possible to suppress a variation in an error of the calculation (positioning) of the position and a direction in which the user is moving can be appropriately shown for the user. Depending on a measurement interval of the GPS module 11, it is possible to determine whether a curve movement is performed (the speed direction is changed) based on an information amount for a long time. Therefore, it is possible to improve determination precision.

1.5.2. Display Method 2

In Display Method 2 illustrated in FIG. 19, the processing unit 18 first determines whether new information regarding GPS acquired by the GPS module 11 is available (step S350). When the processing unit 18 determines that the new information regarding GPS can be used (Yes in step S350), the processing unit 18 acquires the positional information of GPS (step S352). When the processing unit 18 determines that the new information regarding GPS is not available (No in step S350), the processing unit 18 acquires positional information (raw data) calculated using various sensors and stores the positional information in History (storage data group) (step S358).

After the positional information regarding GPS is acquired in step S352, the processing unit 18 obtains an azimuth with each sample dividing History (the storage data group) into N equal pieces (for example, bisection) (step S354). Then, the processing unit 18 calculates a change amount by comparing the azimuths of the samples obtained by dividing the data into N equal pieces (step S356).

Subsequently, the processing unit 18 confirms whether the change amount of the azimuth calculated in step S356 is equal to or greater than a given amount, in other words, whether it can be determined that the curve movement is performed (the speed direction is changed) (step S360). When the processing unit 18 determines that the change amount of the azimuth is equal to or greater than the given amount (Yes in step S360), the processing unit 18 sets the current position and speed at the point of the new position (step S362). Then, the processing unit 18 displays the point of the newly set position on the display unit 14 (step S364).

When the processing unit 18 determines in the confirmation of step S360 that the change amount of the azimuth is not equal to or greater than the given amount (No in step S360), the processing unit 18 ends the series of processes without changing the display of the point of the position.

According to Display Method 2, only when it is determined that the curve movement is performed (the speed direction is changed) (Yes in step S360), the point of a new position is set and a point of the newly set position is displayed. In this way, the points of the positions displayed on the display unit 14 can be decimated, for example, by setting and displaying the points of the positions in a case in which the behavior state such as the curve movement is changed without setting the points of the positions in a case in which there is no change in the behavior state such as a linear exercise. By performing the decimation, it is possible to suppress a variation in an error of the calculation (positioning) of the position and a direction in which the user is moving can be appropriately shown for the user.

In Display Method 2, History (the storage data group) may be timely overwritten to be stored in RingBuff or the like at a positioning interval of GPS (for example, at an interval of 10 seconds). In this way, it is possible to acquire sensor information equivalent to a recent positioning interval (for example, 10 seconds) at any time even referring to History.

The running watch 100 which is a wrist device worn on the wrist of the user has been described above as an example of the wearable device (the portable electronic device) worn on a given part of the user (wearer), but the following wearing examples can be exemplified above. A wearable device may be worn like a necklace that is hung around a neck, may be worn on the trunk of a body, an ankle, or the like, or may be maintained in a pocket or a bag by a user as in a portable information terminal.

Although global Positioning System (GPS) is used as a satellite positioning system in the above description, another global navigation satellite system (GNSS) may be used. For example, one or two or more of the satellite positioning systems such as European Geostationary-Satellite Navigation Overlay Service (EGNOS), Quasi Zenith Satellite System (QZSS), GLObal NAvigation Satellite System (GLONASS), GALILEO, BeiDou (BeiDou Navigation Satellite System) may be used. A Satellite-Based Augmentation System (SBAS) such as Wide Area Augmentation System (WAAS) or European Geostationary-Satellite Navigation Overlay Service (EGNOS) may be used in at least one of the satellite positioning systems.

What is claimed is:

1. A wearable device comprising:
a position detection module;
a sensor that includes at least one of an acceleration sensor, a geomagnetic sensor, and an atmospheric pressure sensor; and
a processor that is electrically connected to the position detection module and the sensor, and is programmed to:
determine a behavior state of a user wearing the wearable device based on signals from both the position detection module and the sensor;
in response to detecting a first predefined condition of the behavior state of the user, deactivate the position detection module while continuing to activate the sensor; and
while the position detection module is deactivated, in response to detecting a second predefined condition of a signal from the sensor, reactivate the position detection module.

2. The wearable device according to claim 1, wherein:
the behavior state includes a linear movement and a curve movement; and
the processor is programmed to:
detect a change in a movement direction of the user based on a current signal from the sensor and a previously obtained signal from the position detection module, the change being greater than a threshold; and
activate the position detection module in response to detecting the change in the movement direction of the user.

3. The wearable device according to claim 1, wherein:
the behavior state includes a body movement period; and
the processor is programmed to:
determine a kind of behavior of the user based on the body movement period; and
control at least two of the position detection module, the acceleration sensor, the geomagnetic sensor, and the atmospheric pressure sensor in accordance with the kind of behavior.

4. The wearable device according to claim 3, wherein the processor is programmed to
control at least two of the position detection module, the acceleration sensor, the geomagnetic sensor, and the atmospheric pressure sensor in accordance with the body movement period of the user.

5. The wearable device according to claim 4, wherein the processor is programmed to
activate the position detection module in accordance with the body movement period.

6. The wearable device according to claim 5, wherein:
the sensor includes at least the acceleration sensor; and
the processor is programmed to:
activate the position detection module; and
in response to activating the position detection module, either deactivate the acceleration sensor or activate a learning function, the learning function correlating data from the position detection module with data from the acceleration sensor.

7. The wearable device according to claim 5, wherein:
the sensor includes at least the geomagnetic sensor; and
the processor is programmed to:
activate the position detection module; and
in response to activating the position detection module, either deactivate the geomagnetic sensor or activate a learning function, the learning function correlating data from the position detection module with data from the geomagnetic sensor.

8. The wearable device according to claim 5, wherein:
the sensor includes at least the geomagnetic sensor; and
the processor is programmed to:
determine that the user is performing a linear movement by a predetermined distance or for a predetermined time based on a signal from the geomagnetic sensor; and
in response to the determination that the user is performing the linear movement by the predetermined distance or for the predetermined time, deactivate the position detection module.

9. The wearable device according to claim 8, wherein:
the position detection module includes an RF reception circuit, a baseband circuit, and an arithmetic device; and
deactivating the position detection module includes deactivating at least one of the RF reception circuit, the baseband circuit, and the arithmetic device.

10. The wearable device according to claim 9, wherein an operation time of the sensor is longer than an operation time of the position detection module.

11. The wearable device according to claim 9, wherein a deactivation timing of the position detection module is subsequent to an activation timing of the sensor.

12. The wearable device according to claim 10, wherein an activation timing of the position detection module is prior to a deactivation timing of the sensor.

13. The wearable device according to claim 11, wherein an activation timing of the position detection module is subsequent to a deactivation timing of the sensor.

14. The wearable device according to claim 10, wherein the processor is programmed to
learn a correlation between a positioning result of the position detection module and an output of the sensor when the position detection module and the sensor are both activated.

15. A method of controlling a wearable device, comprising:
causing a processor of the wearable device to:
determine a behavior state of a user wearing the wearable device based on signals from both a position detection sensor and another sensor, the other sensor including at least one of an acceleration sensor, a geomagnetic sensor, and an atmospheric pressure sensor;
in response to detecting a first predefined condition of the behavior state of the user, deactivate the position detection sensor while continuing to activate the other sensor; and
while the position detection sensor is deactivated, in response to detecting a second predefined condition of a signal from the other sensor, reactivate the position detection sensor.

16. The method of controlling a wearable device according to claim 15, the method comprising:
causing the processor to:
determine a kind of behavior of the user based on a body movement period; and
control at least two of the position detection sensor, the acceleration sensor, the geomagnetic sensor, and the atmospheric pressure sensor in accordance with the kind of behavior.

17. The method of controlling a wearable device according to claim 16, the method comprising:
causing the processor to control at least two of the position detection sensor, the acceleration sensor, the geomagnetic sensor, and the atmospheric pressure sensor in accordance with the body movement period of the user.

18. The method of controlling a wearable device according to claim 16, the method comprising:
causing the processor to activate the position detection sensor in accordance with the body movement period.

19. A wearable device comprising:
a first sensor;
a second sensor; and
a processor programmed to:
determine a movement of a user wearing the wearable device based on signals from both the first sensor and the second sensor;
detect a first predetermined condition of the movement of the user;
in response to detecting the first predetermined condition of the movement of the user, deactivate the first sensor such that the movement of the user is determined based on a current signal from only the second sensor; and
while the first sensor is deactivated, in response to detecting a second predetermined condition of the current signal from the second sensor, reactivate the first sensor.

20. The wearable device of claim 19, wherein the processor is programmed to
while the first sensor is deactivated, detect the second predetermined condition of the current signal from the second sensor.

21. The wearable device of claim 19, wherein:
the first sensor is a position detection sensor; and
the second sensor is at least one of an acceleration sensor, a geomagnetic sensor, and an atmospheric pressure sensor.

* * * * *